(12) United States Patent
Fang et al.

(10) Patent No.: US 12,156,064 B2
(45) Date of Patent: Nov. 26, 2024

(54) REPORTING MEASUREMENTS FOR MINIMIZATION OF DRIVING TEST IN WIRELESS COMMUNICATION

(71) Applicant: ZTE Corporation, Guangdong (CN)

(72) Inventors: Jianmin Fang, Guangdong (CN); He Huang, Guangdong (CN); Jing Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 244 days.

(21) Appl. No.: 17/582,745

(22) Filed: Jan. 24, 2022

(65) Prior Publication Data

US 2022/0232410 A1 Jul. 21, 2022

Related U.S. Application Data

(63) Continuation of application No. PCT/CN2019/097701, filed on Jul. 25, 2019.

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC ..... H04W 24/10; H04W 24/08; H04W 76/15; H04W 28/0252; H04L 5/0032
See application file for complete search history.

(56) References Cited

U.S. PATENT DOCUMENTS

| 9,272,851 | B2 | 3/2016 | Hwang et al. |
| 2012/0252487 | A1 | 10/2012 | Siomina et al. |
| 2012/0329402 | A1 | 12/2012 | Ren et al. |
| 2013/0114454 | A1 | 5/2013 | Hwang et al. |
| 2013/0279357 | A1 | 10/2013 | Gao et al. |
| 2014/0133313 | A1* | 5/2014 | Kawasaki ............. H04W 24/10 370/241.1 |

(Continued)

FOREIGN PATENT DOCUMENTS

| CN | 101998463 A | 3/2011 |
| CN | 103733668 A | 4/2014 |

(Continued)

OTHER PUBLICATIONS

International Search Report and Written Opinion mailed on Apr. 23, 2020 for International Application No. PCT/CN2019/097701, filed on Jul. 25, 2019 (8 pages).

(Continued)

*Primary Examiner* — Anez C Ebrahim
(74) *Attorney, Agent, or Firm* — Perkins Coie LLP

(57) ABSTRACT

Methods, systems, and devices related to digital wireless communication, and more specifically, to techniques related to reporting minimization of driving test (MDT) measurements. In one exemplary embodiment, a method for wireless communication includes receiving a configuration for reducing driving test overhead from a core network node and state information indicating a state of a terminal from a terminal. The method may also include determining the state of the terminal based on the state information indicating the state (Continued)

of the terminal. The method may also include transmitting a measurement report to a network node including the state information indicating the state of the terminal.

20 Claims, 21 Drawing Sheets

(56) References Cited

U.S. PATENT DOCUMENTS

| | | | |
|---|---|---|---|
| 2014/0155056 A1 | 6/2014 | Jactat et al. | |
| 2015/0289157 A1 | 10/2015 | Lundqvist et al. | |
| 2016/0360475 A1 | 12/2016 | Lindoff et al. | |
| 2017/0105136 A1 | 4/2017 | Reider et al. | |
| 2017/0202042 A1 | 7/2017 | Gao et al. | |
| 2020/0178137 A1* | 6/2020 | Hassan Hussein | H04B 7/18541 |
| 2021/0076242 A1 | 3/2021 | Hong | |
| 2022/0158781 A1* | 5/2022 | Zhu | H04W 24/10 |

FOREIGN PATENT DOCUMENTS

| | | |
|---|---|---|
| CN | 104012138 A | 8/2014 |
| CN | 109451815 A | 3/2019 |
| CN | 109474949 A | 3/2019 |
| EP | 2713646 A2 | 4/2014 |
| WO | 2014007816 A1 | 1/2014 |
| WO | 2014190912 A1 | 12/2014 |

OTHER PUBLICATIONS

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," TS 37.320 V15.0.0, 29 pages, Jul. 2018.

European Search Report for EP Patent Application No. 19938940.4, dated Jun. 21, 2022, (10 pages).

Samsung, "Introducing WIs endorsed for ASN.1 review of 36.331 REL-15 second drop," 3GPP TSG WG2 meeting #103, R2-1812967, Gothenburg, Sweden, Aug. 20-24, 2018, 923 pages.

European Communication pursuant to Article 94(3) EPC issued in EP Patent Application No. 19938940.4, dated Jul. 6, 2023, 10 pages.

European Communication pursuant to Article 94(3) EPC issued in EP Patent Application No. 19938940.4, dated Jun. 26, 2024, 5 pages.

Chinese Notification to Complete Formalities of Registration issued in CN Patent Application No. 201980098621.9, dated Sep. 12, 2024, 7 pages. English translation included.

\* cited by examiner

REPORTING MEASUREMENTS FOR MINIMIZATION OF DRIVING TEST IN WIRELESS COMMUNICATION

CROSS-REFERENCE TO RELATED APPLICATIONS

This application is a continuation of International Patent Application No. PCT/CN2019/097701, filed on Jul. 25, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to reporting minimization of driving test (MDT) measurements.

In an exemplary embodiment, a method for wireless communication includes receiving a configuration for reducing driving test overhead from a core network node and state information indicating a state of a terminal from a terminal. The method may also include determining the state of the terminal based on the state information indicating the state of the terminal. The method may also include transmitting a measurement report to a network node including the state information indicating the state of the terminal.

In another exemplary embodiment, a method for wireless communication may include receiving, by a terminal, a configuration for minimization of driving test (MDT) from a communication node. The method may also include determining, by the terminal, that the terminal is in a special state, wherein the terminal is configured to not perform any measurement while in the special state or transmit any measurements recorded by the terminal in the special state with an indicator that the terminal is in the special state to the communication node.

In another exemplary embodiment, a method for wireless communication includes receiving, by a terminal, a logged configuration for reducing driving test overhead from a communication node. The method may also include performing, by the terminal, measurement while in an idle or inactive state based on the configuration for reducing driving test overhead. The method may also include recording, by the terminal, all measurement records performed by the terminal in a normal state. The method may also include transmitting, by the terminal, the measurement records to the base station.

In another exemplary embodiment, a method for wireless communication includes receiving, by a communication node, a logged configuration for reducing driving test overhead from a network node. The method also includes transmitting, by the communication node, the logged configuration for reducing driving test overhead to a first terminal and a second terminal, wherein the first terminal and second terminal are configured to perform measurement in an idle or inactive state and record any measurement records when each of the first terminal and the second terminal are in a normal state. The method also includes receiving, by the communication node, the measurement records recorded by the first terminal and the second terminal.

In another exemplary aspect, a method for wireless communication includes receiving, by a terminal, a logged configuration for reducing driving test overhead from a base station, the logged configuration including an interval configured for an out of coverage periodic measurement, where the interval configured for the out of coverage periodic measurement is different than the interval configured for the logged configuration. The method also includes performing, by the terminal, an out of coverage periodic measurement and recording the out of coverage periodic measurement at each time instance identified by the interval configured for the out of coverage periodic measurement when the terminal enters a camped on any cell selection state. The method also includes sending, by the terminal, the out of coverage periodic measurement records recorded by the terminal to the base station.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions.

1. A solution for wireless communication, comprising: receiving, by a communication node, a configuration for reducing driving test overhead from a core network node and state information indicating a state of a terminal from a terminal; determining, by the communication node, the state of the terminal based on the state information; and transmitting, by the communication node, a measurement report to a network node including the state information indicating the state of the terminal.

2. The solution of claim 1, wherein the measurement report includes a measurement performed by any of the terminal or the communication node.

3. The solution of claim 1, wherein the configuration for reducing driving test overhead indicates a first set of measurements to be performed by the communication node and/or a second set of measurements to be performed by any of the terminal or the communication node with the terminal, wherein the configuration for reducing driving test overhead includes a minimization of driving test (MDT) configuration.

4. The solution of claim 3, further comprising: receiving, by the communication node, the second set of measurements performed by the terminal and information indicating an updated state of the terminal; forwarding, by the communication node, the second set of measurements and the information indicating the updated state of the terminal to the network node, wherein the network node is configured to perform statistical processing of the second set of measurements based on identifying that the information indicating the updated state of the terminal indicates that the terminal is in the special state.

5. The solution of claim 3, further comprising: forwarding, by the communication node, the received configuration to the terminal, wherein the terminal is configured to perform the second set of measurements based on the configuration.

6. The solution of claim 1, further comprising: receiving, by the communication node, a terminal status report from the terminal indicating that the terminal is in the special state, wherein the terminal status report is transmitted based on a triggering of a status change of the terminal or an occurrence of a period reporting time instance.

7. The solution of claim 3, further comprising: transmitting, by the communication node, a configuration partial success message to the core network node, the configuration partial success message indicating that the first set of measurements are capable of being performed by the communication node and the second set of measurements are not capable of being performed by the terminal.

8. The solution of claim 1, further comprising: sending, by the communication node, a configuration failure message to the core network node based on determining that the terminal is in the special state, the configuration failure message indicating that the terminal is not capable of performing any measurements.

9. The solution of claim 9, further comprising: receiving, by the communication node, an additional configuration that includes a first set of measurements for the terminal; and performing, by the communication node, the first set of measurements according to the additional configuration.

10. The solution of claim 1, further comprising: transmitting, by the communication node, a special status message to the core network node indicating that the terminal is in the special state; receiving, by the communication node, a deactivation message from the core network node including information for deactivating measurements by the terminal; and forwarding, by the communication node, the deactivation message to the terminal, wherein the terminal is configured to deactivate measurements based on receiving the deactivation message.

11. The solution of claim 3, further comprising: transmitting, by the communication node, a special status message to the core network node indicating that the terminal is in the special state; receiving, by the communication node, a configuration that does not include measurements that are not capable of being performed by the terminal based on the core network node determining that the terminal is in the special state; and forwarding, by the communication node, the configuration to the terminal.

12. The solution of claim 1, further comprising: transmitting, by the communication node, a special status message to the core network node indicating that the terminal is in the special state; receiving, by the communication node, a status exit report from the terminal indicating that the terminal has exited the special state and has entered into a normal state; forwarding, by the communication node, the status exit report to the core network node; and receiving, by the communication node, a second configuration from the core network node based on the core network node receiving the status exit report.

13. The solution of claim 1, further comprising: receiving, by the communication node, a special status report from a second terminal indicating whether a second terminal is in the special status; receiving, by the communication node, the configuration from an operation administration and maintenance (OAM) node; selecting, by the communication node, a selected terminal based on receiving the special status report from the second terminal indicating that the second terminal is not in the special status; and forwarding, by the communication node, the configuration to the selected terminal.

14. The solution of claim 1, wherein the measurement includes an immediate MDT measurement corresponding to a radio resource control connected state.

15. The solution of claim 1, wherein the state information indicates at least one of the following: the terminal is in an overheating state, the terminal is in a power saving state, the terminal is in a special or normal state, the terminal has entered or exited the overheating state, the terminal has entered or exited the power saving state, the terminal has entered or exited the special state, an indication of a severity level, and a measurement list including measurements that are not capable of being performed.

16. A solution for wireless communication, comprising: receiving, by a terminal, a configuration for reducing driving test overhead from a communication node; and determining, by the terminal, that the terminal is in a special state based on the received configuration for reducing driving test overhead, wherein the terminal is configured to not perform any measurement while in the special state or transmit any measurements recorded by the terminal in the special state with an indicator that the terminal is in the special state to the communication node.

17. A solution for wireless communication, comprising: receiving, by a terminal, a logged configuration for reducing driving test overhead from a communication node; performing, by the terminal, measurement while in an idle or inactive state based on the configuration for reducing driving test overhead; recording, by the terminal, all measurement records performed by the terminal in a normal state; and transmitting, by the terminal, the measurement records to the base station.

18. The solution of claim 17, further comprising: determining, by the terminal, that the terminal is in a special state; and discarding, by the terminal, any measurement records recorded by the terminal in the special state or transmitting any measurement records recorded by the terminal in the special state with an indication of being in the special state or the terminal does not perform any measurement while in the special state.

19. A solution for wireless communication, comprising: receiving, by a communication node, a logged configuration for reducing driving test overhead from a network node; transmitting, by the communication node, the logged configuration for reducing driving test overhead to a first terminal and a second terminal, wherein the first terminal and second terminal are configured to perform measurement in an idle or inactive state and record any measurement records when each of the first terminal and the second terminal are in a normal state; and receiving, by the communication node, the measurement records recorded by the first terminal and the second terminal.

20. The solution of claim 19, wherein, based on receiving the logged configuration for reducing driving test overhead, the first terminal and the second terminal are configured to: determine that the first terminal or the second terminal is in a special state; and discard, by the first terminal or second terminal, any measurement records recorded by the terminal in the special state, or transmitting, by the first terminal or second terminal, each of the measurement records recorded by the first terminal or second terminal in the special state with an indication of being in the special state, or the first terminal or second terminal does not perform any measurement while in the special state.

21. A solution for wireless communication, comprising: receiving, by a terminal, a logged configuration for reducing driving test overhead from a base station, the logged configuration including an interval configured for an out of coverage periodic measurement, where the interval configured for the out of coverage periodic measurement is different than the interval configured for the logged configuration; performing, by the terminal, an out of coverage periodic measurement and recording the out of coverage periodic measurement at each time instance identified by the interval configured for the out of coverage periodic measurement when the terminal enters a camped on any cell selection state; and sending, by the terminal, the out of coverage periodic measurement records recorded by the terminal to the base station.

22. The solution of claim 21, wherein out of coverage measurement record includes any of: a terminal in out of coverage status, a terminal entering the out of coverage status, a terminal exiting the out of coverage status, terminal location information, a moving direction of the terminal, a terminal moving speed information, time information of a time when the terminal enters the out of coverage status, time information of a time when the terminal exits the out of coverage status, a time duration of a terminal being in out of coverage status, current time information.

23. An apparatus for wireless communication comprising a processor that is configured to carry out the solution of any of claims 1 to 22.

24. A non-transitory computer readable medium having code stored thereon, the code when executed by a processor, causing the processor to implement a solution recited in any of claims 1 to 22.

The details of one or more implementations are set forth in the accompanying attachments, the drawings, and the description below. Other features will be apparent from the description and drawings, and from the claims.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
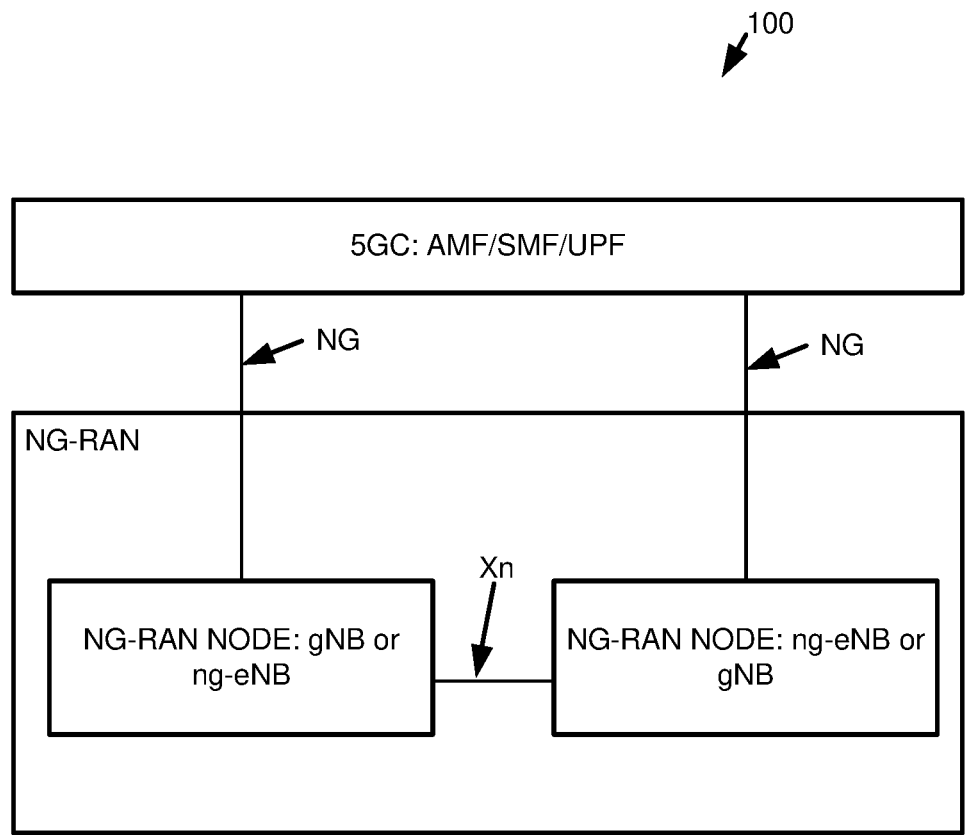
FIG. 1 illustrates an example network architecture.

As shown in FIG. 1, a 5G mobile communication system 100 can include a 5G core network (5GC) and a next generation radio access network (NG-RAN). The 5GC may include network nodes, such as an Access Mobility Function (AMF), Session Management Function (SMF), User Plane Function (UPF), NG-RAN, etc. Radio access technologies (RATs) in the base station may include any of a ng-eNB that can continue as an evolved 4G base station (or eNB) (i.e., the air interface remains a 4G-RAT evolved universal terrestrial radio access evolved universal terrestrial radio access (E-UTRA)), and a 5G base station gNB based on a 5G RAT or NR. The NG-RAN base station may be connected to the 5GC through a NG interface, and the NG-RAN base stations may be connected through a Xn interface.

Figure 2:
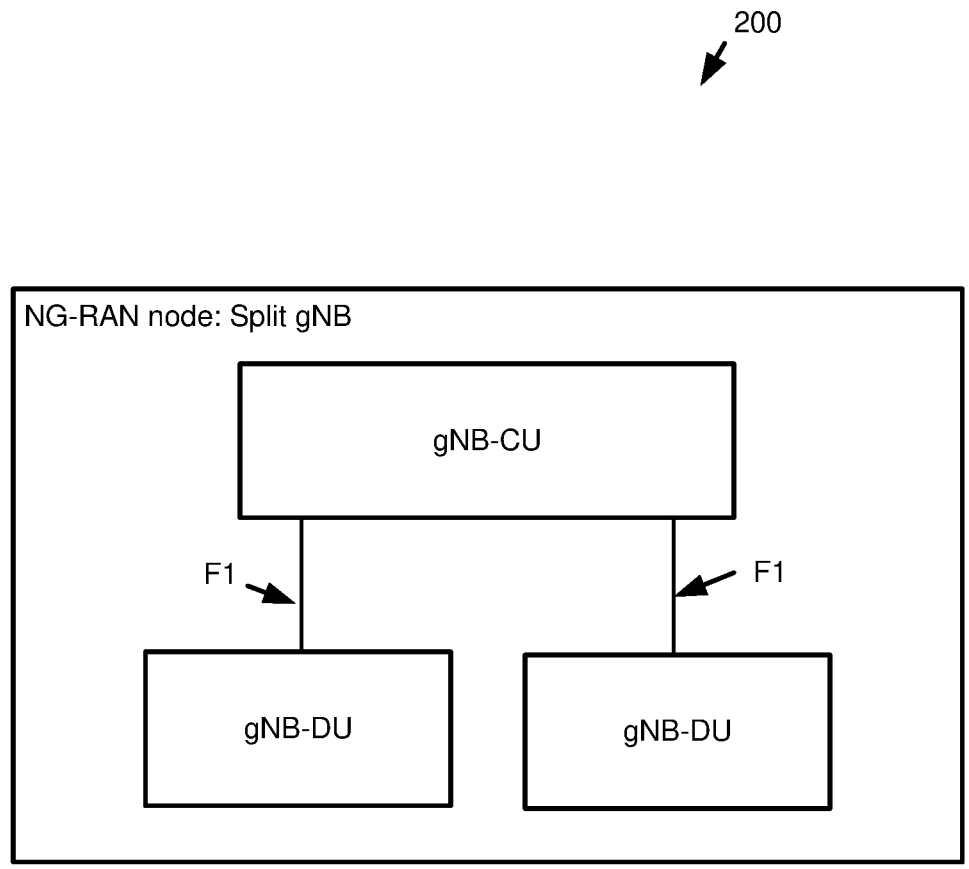
FIG. 2 illustrates an example gNB structure diagram.

As shown in FIG. 2, a gNB may be separated into a gNB-CU and multiple gNB-DU network node entities, which can be connected by an F1 interface. The external interface of the gNB after the CU/DU separation may still include the NG and Xn interfaces. The base station and the terminal UE may be connected through an air interface (Uu).

Dual Connectivity (DC) may be supported in both 4G and 5G systems. Dual connected UE may remain connected with two base stations, wherein a base station may be one of a master node (MN) and the other is a secondary node (SN). A composition of a primary cell group (e.g., Master Cell Group (MCG)) cells involved in a double connection operation in the main base station, a composition of the secondary cell group (Secondary Cell Group (SCG)) located in the secondary base station, the primary cell of a primary cell group (Primary Cell (Pcell)), where the primary cell in the secondary cell group may be called a primary SCG Cell (PSCell).

For measuring a time-consuming manual drive a 4G system from a Rel-10 release, a minimization of driving test (MDT) may be utilized. The MDT technology may utilize the base station and the UE to measure various network performance indicators, and then reports the measured indicates to a Trace Collection Entity (TCE).

An MDT can be divided into a management-based MDT and a signaling based MDT. The activation process of the management-based MDT may be performed by the OAM sending a trace session activation message including the MDT configuration information to the eNB, and the eNB may select an appropriate UE in the area scope specified by the message to configure the MDT. The message may be sent to the selected UE. An MDT signaling-based activation process may trace an activation message sent by the OAM configuration information MDT comprising a user Home Subscriber Server (HSS) to activate the MDT measurement to the specified UE. The HSS can then specify MDT configuration information to be sent to the UE. The core network may send the MDT configuration information of the specified UE to the eNB, and the eNB may forward the MDT configuration information to the designated UE to perform the MDT measurement.

Figure 3:
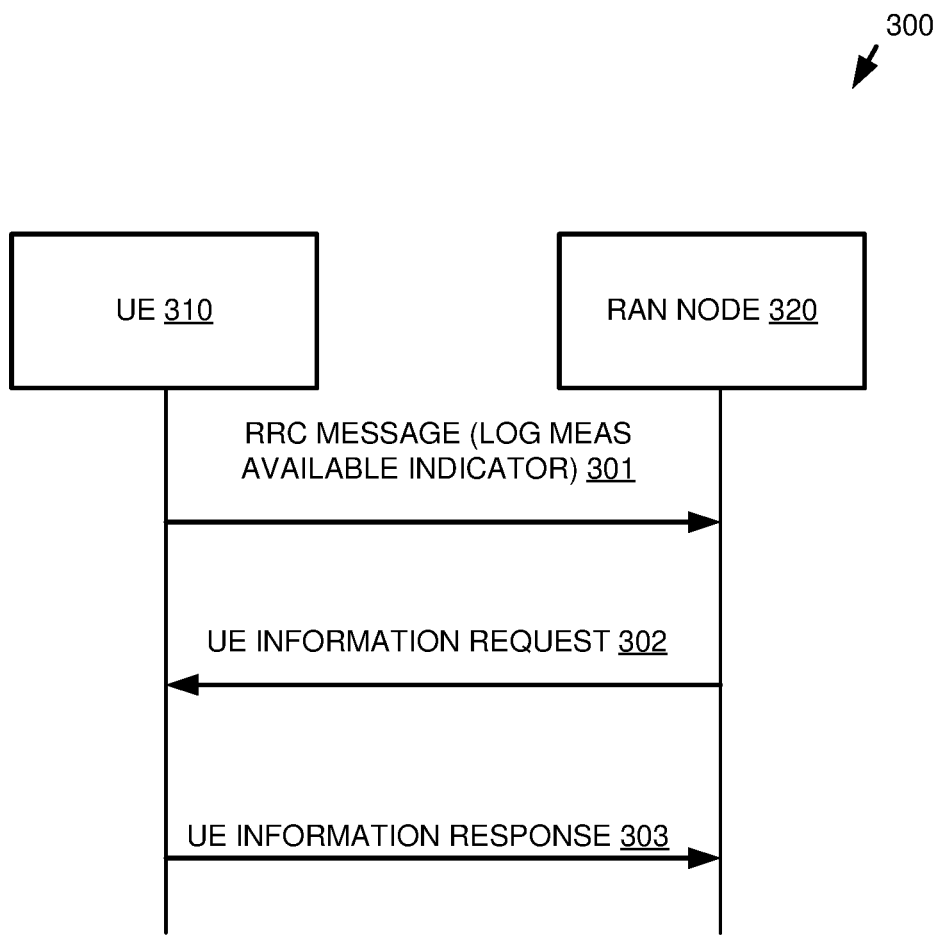
FIG. 3 illustrates a diagram of an example signaling process of reporting logged MDT measurement results.

The MDT may be classified into a logged MDT (e.g., the corresponding UE may be in an idle state RRC_IDLE or an inactive state RRC_INACTIVE) and an immediate MDT (e.g., corresponding to connection state RRC_CONNECTED) according to an RRC state when the UE performs MDT. A Logged MDT may indicate that the UE is in RRC_IDLE or RRC_INACTIVE state, according to the relevant MDT configuration information previously received at the time of a connected state (e.g., a MDT Logged effective range, the recording interval and recording duration), execution Logged MDT measurement, recording and the measurement result is the MDT log. When the UE returns to the RRC_CONNECTED state, as shown in FIG. 3, an indication of 'with measurement record' may be sent to the base station through a suitable RRC uplink message (such as RRCConnectionSetupComplete). If desired, the base station can send a UE INFORMATION REQUEST message to the UE, requesting MDT logs reported by the UE, one or more UE by UE INFORMATION RESPONSE message (depending on the size of the log MDT), or all or part of MDT log reporting. After receiving the MDT log, the base station may forward it to the TCE for statistical processing. An Immediate MDT may refer to the UE measurements (i.e., measurements can also be in a connected state) and immediately reports the measurement result (e.g., the measurement result of the UE may not be stored) immediately after receiving the connection state information relevant MDT configuration. Some Immediate MDT measurements can also be done by the base stations themselves, without the need for the UE to provide the measurements.

System Overview

This patent document describes techniques that can be implemented to report MDT measurements. When the UE is in a special state (e.g., overheating, power saving energy, etc.), the MDT UE may no longer be suitable for other operations. A method for reporting MDT measurements, including at least one of the following:

1. When reporting the MDT measurement result, the UE can include the UE special status information (indicating that the UE is in a special state) in the reported MDT measurement result (e.g., an indication that some MDT measurement records in the MDT measurement result mark the UE in a special state). After the MDT measurement results are reported to the network, the network (e.g., base station, TCE, etc.) may decide how to handle the MDT measurement records of these UEs in a special state (for example, ignoring these records).

2. The UE can notify the base station of the special state information of the UE (indicating that the UE is in a special state) (e.g., notifying the base station entering or leaving the special state, or periodically reporting the state of the UE). The base station can notify the UE of the special state information to the CN (e.g., when receiving the UE special state information from the UE), and the CN can determine how to process according to the UE special state information when performing the MDT for the designated UE (e.g., not for the designated UE to the base station). The MDT configuration information can be sent, or the MDT configuration information that the UE needs to complete is not included in the MDT configuration information.

3. The UE may notify the base station of the UE special status information (indicating that the UE is in a special state) (e.g., notifying the base station when entering or leaving the special state, or periodically reporting the status of the UE). If the base station receives the MDT configuration information for the specified UE from the CN, if the base station finds that the specified UE is in the special state, the base station may send the MDT configuration failure message carrying the failure reason to the CN indicating that the UE is in a special state.

4. The UE may notify the base station of the UE special status information (indicating that the UE is in a special state) (e.g., notifying the base station when entering or exiting the special state, or periodically reporting the status of the UE). The base station may receive the MDT configuration information for the specified UE from the CN, and if the specified UE is currently in the special state, the base station may send the MDT configuration information to the UE and send the UE special status information to the CN, the CN may decide how to handle it (e.g., deactivating the MDT of the specified UE or deleting the MDT measurement required by the UE in the MDT configuration information of the specified UE).

5. The UE may notify the base station of the special state information of the UE (indicating that the UE is in a special state) (e.g., notifying the base station when entering or leaving the special state, or periodically reporting the state of the UE (the special state or the normal state). After receiving the MDT configuration information from the OAM, the base station may not select the UE in the special state to perform the MDT according to the special state information of each UE.

6. The base station may receive the MDT configuration information from the CN for the specified UE. The base station may send the MDT configuration information to the UE. The base station may receive the UE special status information from the UE to indicate that the UE is in a special state, and the base station sends a TRACE FAILURE INDICATION message to the CN indicating that the UE is in a special state.

7. The UE may notify the base station of the special state information of the UE (indicating that the UE is in the special state), and the base station may notify the CN of the special state information of the UE. When the MDT is performed for the designated UE, the CN may determine how to process according to the special state information of the UE (for example, not for the UE, or deletes some or all of the MDT measurements that the UE needs to complete in the MDT configuration information).

8. The UE may notify the base station of the UE special status information (indicating that the UE is in a special state), and the UE special status information may include at least one of the following: a state in which the UE is located (e.g., a special state, a normal state, an overheated state, and an energy saving state), the UE entering a certain state (for example, enters a special state, enters an overheated state, enters a state of energy saving), and the UE exiting a certain state (for example, exiting a special state, exiting an overheated state, exiting a power saving state), the severity (e.g., high, medium, low), and measurement information that may not be performed temporarily.

9. The base station may notify the CN of the special state information of the UE (indicating that the UE is in a special state), and the UE special state information may include at least one of the following: a state in which the UE is located (e.g., a special state, a normal state, an overheated state, and an energy saving state), the UE enters a certain state (for example, enters a special state, enters an overheated state, enters a state of energy saving), and the UE exits a certain state (for example, exiting a special state, exiting an overheated state, exiting a power saving state), the severity (e.g., high, medium, low), and measurement information that may not be performed temporarily.

Example Embodiment 1

Figure 4:
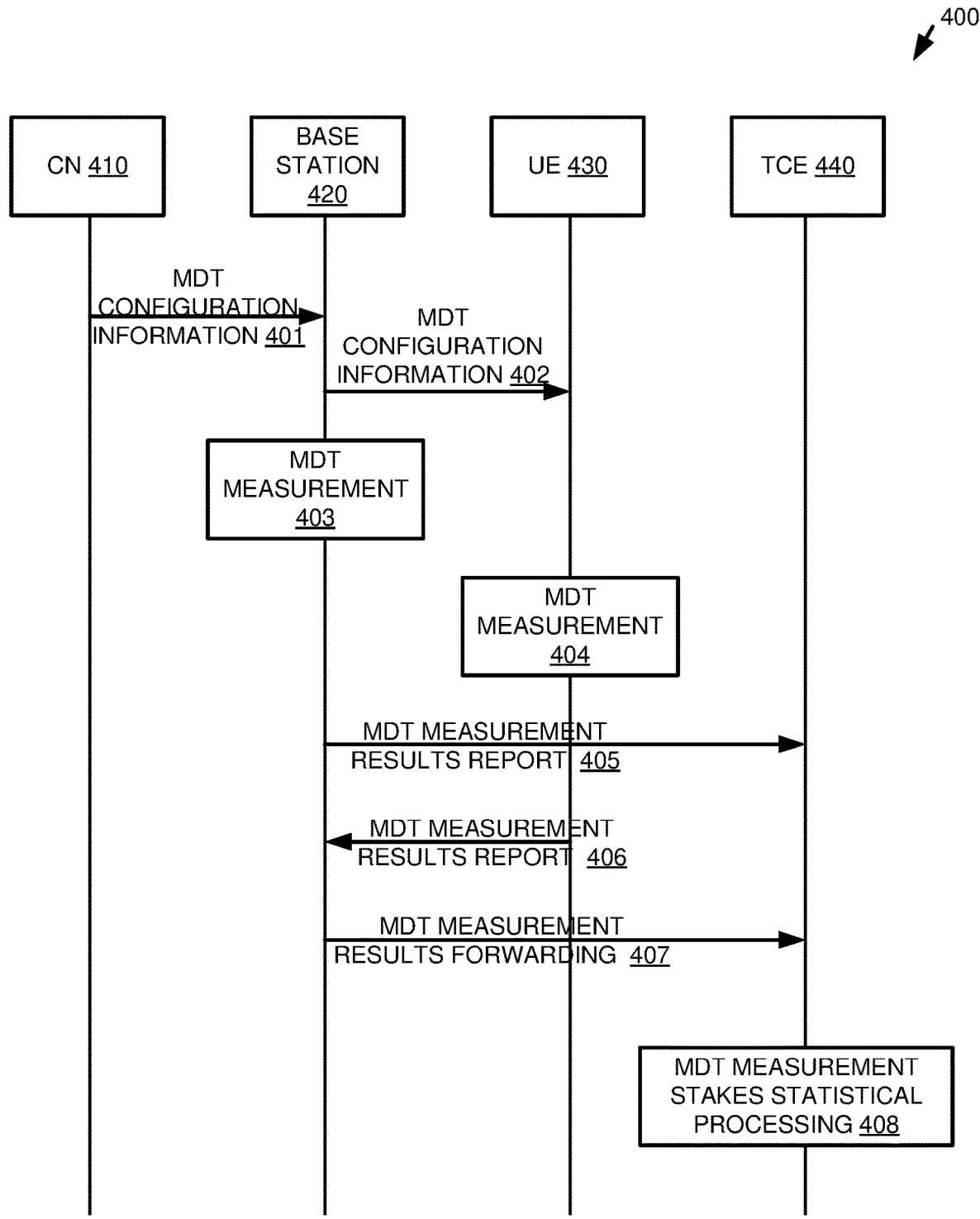
FIG. 4 illustrates a diagram of a signaling process for reporting MDT measurements, according to a first example embodiment or a second example embodiment.

FIG. 4 illustrates a diagram of a signaling process 400 for reporting MDT measurements, according to a first example embodiment or a second example embodiment. In step 401, MDT configuration information may be sent from a CN 410 to a base station 420. The CN may send immediate MDT configuration information to the base station and designate a UE for MDT measurement.

In step 402, the base station 420 sends related MDT configuration information to the designated UE 430 according to the MDT configuration information received from the CN. The MDT configuration information sent by the CN to the base station may include a plurality of measurement information, and some of the measurements may be completed by the UE, and some of the measurement may be completed by the base station. The relevant MDT configuration information sent by the base station to the designated UE may include only the measurement information that needs to be completed by the UE.

In step 403, The base station 420 may perform a related MDT measurement.

In step 404, the UE 430 may perform a related MDT measurement.

In step 405, the base station 420 may send a relevant MDT measurement results report to the TCE 440.

In step 406, the UE 430 reports the relevant MDT measurement result to the base station 420. The MDT measurement result may include a plurality of MDT measurement records for each MDT measurement record, and if the relevant MDT measurement is performed by the UE in a special state, the MDT measurement record may include a UE special status indication. The UE special status indication may be used to indicate that the UE is in a special state such as overheating, power saving, etc.

In step 407, the base station 420 forwards relevant MDT measurement result reported by the UE to the TCE 440.

In step 408, the TCE may perform statistical processing on the received MDT measurement result (e.g., may include multiple MDT measurement records), and may ignore the MDT measurement records including an indication indicating that the UE is in a special state (i.e., not perform statistical processing on such MDT measurement records).

Example Embodiment 2

As shown in FIG. 4, the base station 420 may forward relevant MDT measurement result reported by the UE to the TCE 440, but first checks each MDT measurement record in the MDT measurement result when forwarding and ignores the MDT measurement record when the MDT measurement record includes the UE special status indication. That is, the MDT measurement record may not be forwarded to the TCE in step 407.

In step 408, the TCE 408 may perform statistical processing on the received MDT measurement result.

Example Embodiment 3

Figure 5:
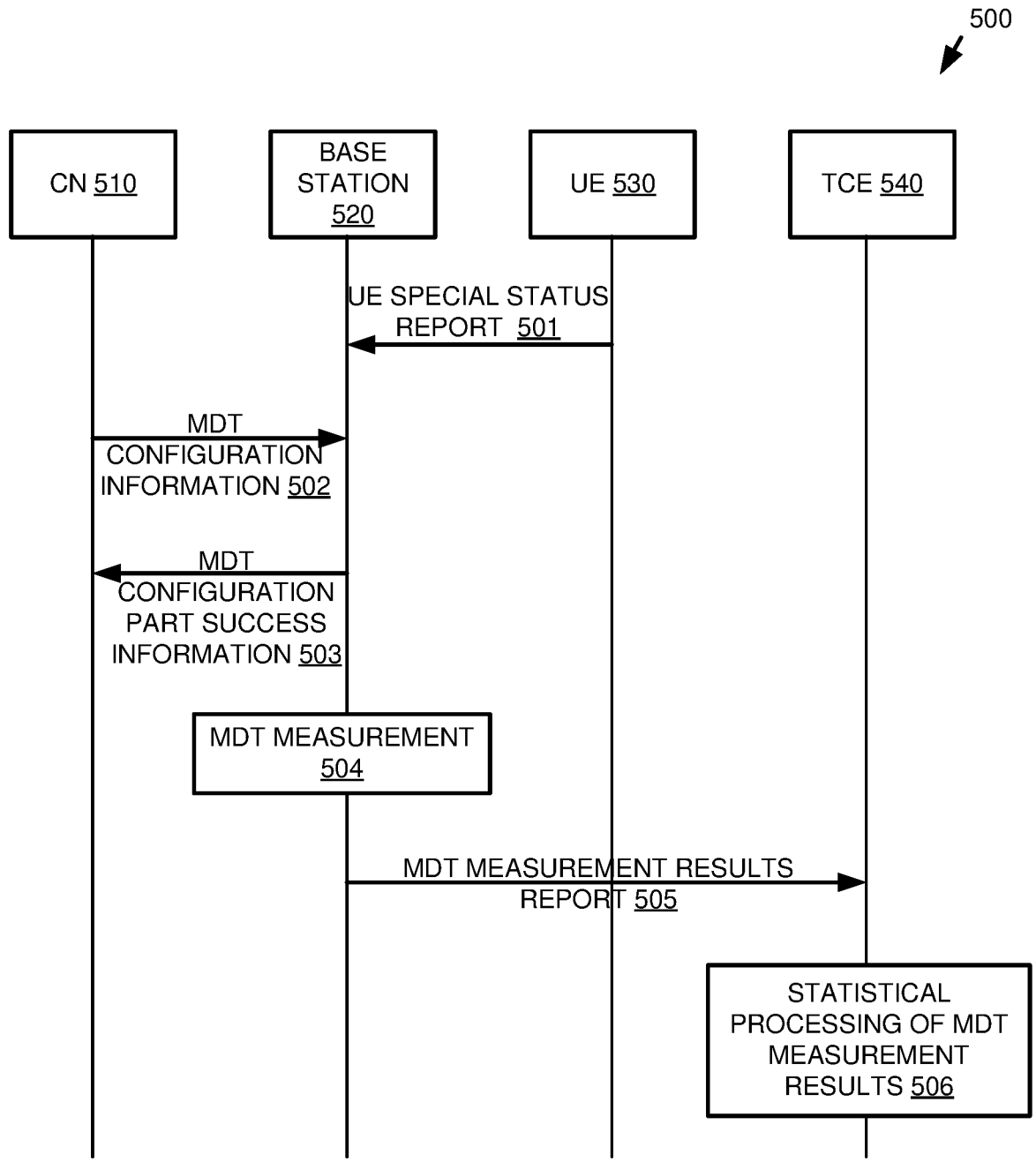
FIG. 5 illustrates a diagram of a signaling process for reporting MDT measurements, according to a third example embodiment.

FIG. 5 illustrates a diagram of a signaling process 500 for reporting MDT measurements, according to a third example embodiment. In step 501, the UE 530 may report to the base station 520 that the UE is currently in a special state such as overheating, energy saving, and the like. The UE may report to the base station that the UE is currently in a special state by means of event triggering or periodic reporting. When reporting to the base station by the event triggering report mode, the UE may report to the base station that the UE currently enters and exits the special state when entering and exiting the special state.

In step 502, the CN 510 may send MDT configuration information to the base station 520 specifying a UE MDT measurement.

In step 503, the base station 520 may finds that the designated UE is currently in a special state according to the MDT configuration information received from the CN. The MDT configuration information sent by the CN to the base station may include a plurality of measurement information, and some of the measurements need to be completed by the UE, and some of the measurements need to be completed by the base station. The base station may agree with the measurements that can be completed by itself and rejects the measurements that need to be completed by the UE. The base station may send the MDT configuration partial success information to the CN, and the MDT configuration partial success information includes at least one of the following: an agreed measurement identifier, a rejected measurement identifier, and a rejection reason (the UE is currently in a special state).

In step 504, the base station 520 may perform a MDT measurement.

In step 505, the base station 520 may send a MDT measurement results report to the TCE 540.

In step 506, the TCE 540 may perform a statistical processing of MDT measurement results.

Example Embodiment 4

Figure 6:
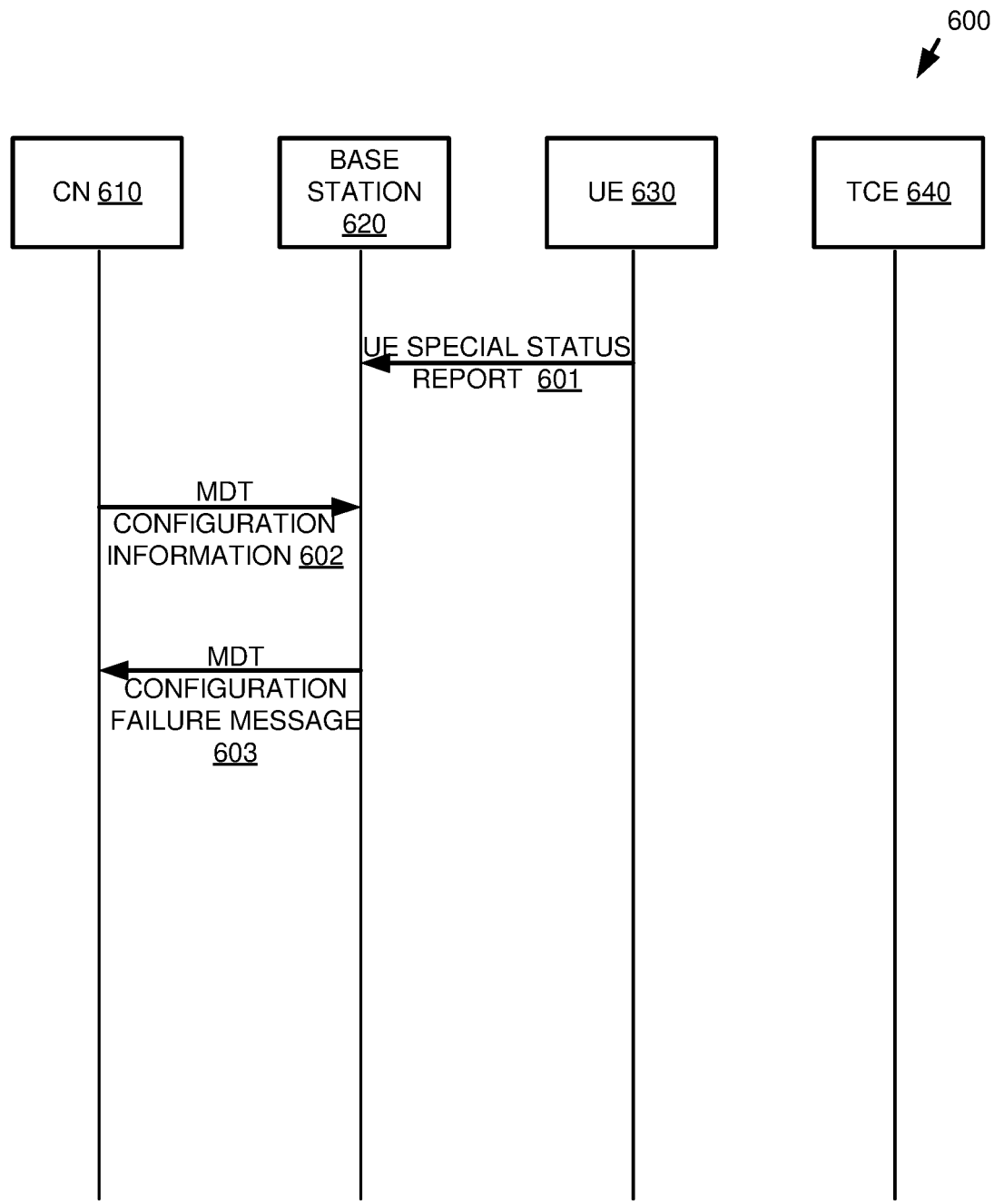
FIG. 6 illustrates a diagram of a signaling process for reporting MDT measurements, according to a fourth example embodiment.

FIG. 6 illustrates a diagram of a signaling process 600 for reporting MDT measurements, according to a fourth example embodiment. In step 601, the UE 630 may report to the base station 620 that the UE is currently in a special state, such as overheating, energy saving, etc. The UE may report to the base station that the UE is currently in a special state by means of event triggering or periodic reporting. When reporting to the base station by the event triggering report mode, the UE 630 may report to the base station that the UE currently enters and exits the special state when entering and exiting the special state.

In step 602, the CN 610 may send Immediate MDT configuration information to the base station 620 and the UE designated for MDT measurement.

In step 603, the base station 620 may determine that the designated UE is currently in a special state according to the MDT configuration information received from the CN. The MDT configuration information sent by the CN to the base station may include multiple measurement information, some of which need to be completed by the UE, and some of which need to be completed by the base station. In this embodiment, it may be assumed that all measurements require the UE to complete, or although some measurements do not require the UE to complete but still to be refused. The base station may send an MDT configuration failure message to the CN. The MDT configuration failure message may include at least one of the following: an identifier of the agreed measurement, an identifier of the rejected measurement, and a reason for the failure (the UE is currently in a special state). The MDT configuration failure message can be a TRACE FAILURE INDICATION message.

Example Embodiment 5

Figure 7:
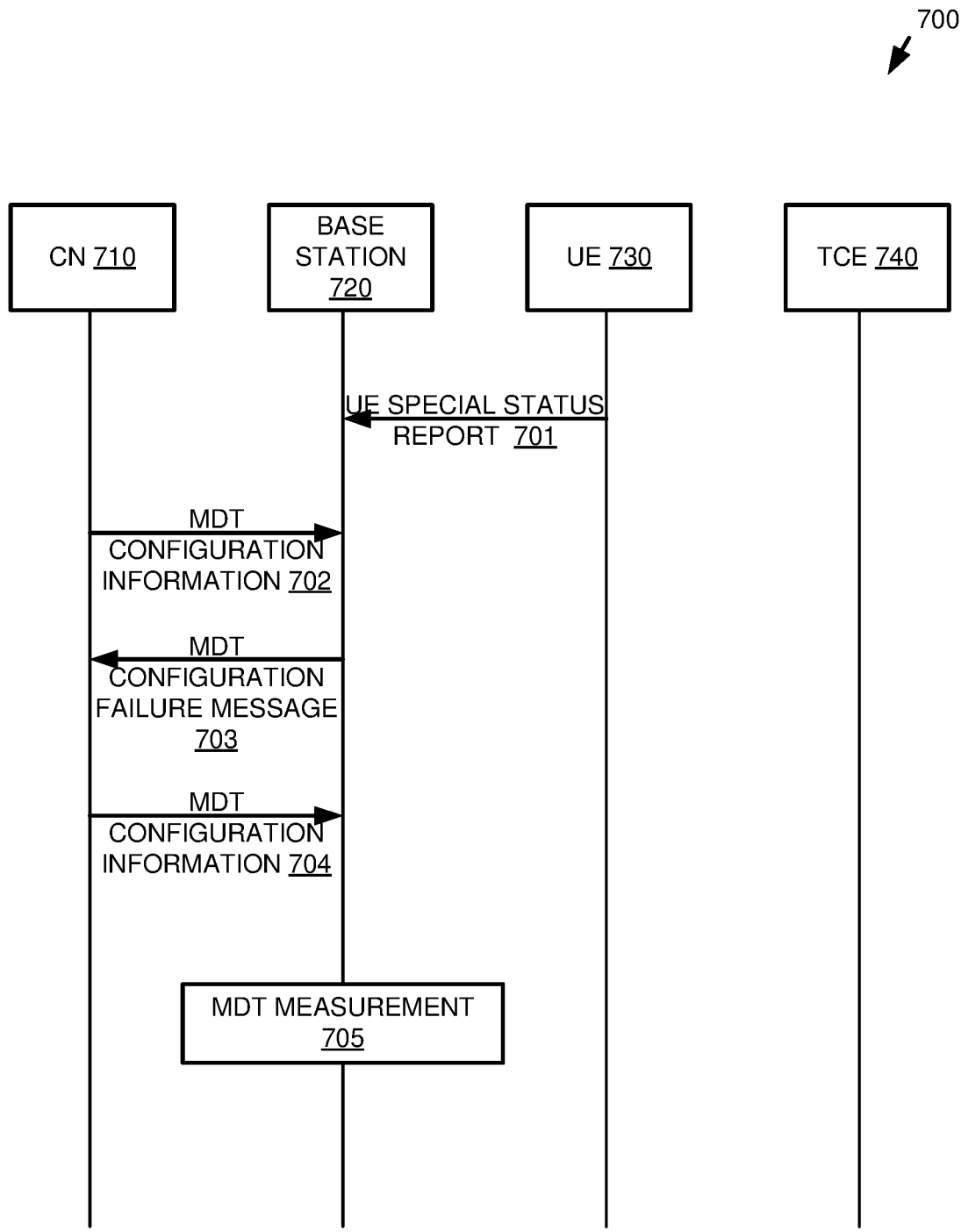
FIG. 7 illustrates a diagram of a signaling process for reporting MDT measurements, according to a fifth example embodiment.

FIG. 7 illustrates a diagram of a signaling process 700 for reporting MDT measurements, according to a fifth example embodiment. Steps 701-703 may be similar to 601-603 as described with respect to FIG. 6.

In step 704, the CN 710 may send MDT configuration information for a specified UE to the base station according to a failure reason included in the MDT configuration failure message indicating that the UE is currently in a special state, and the MDT configuration information does not include any MDT measurement requiring the UE to complete, and no longer includes the rejected MDT measurement.

In step 705, the base station 720, based on the MDT configuration information received from the CN, may find that the specified UE is currently in a special state, but the MDT configuration information may not include the measurement are to be completed by the UE, and does not include the measurement that is to be rejected, and therefore may not be sent to the CN the MDT configuration failure message. The base station may perform a related MDT measurement according to the MDT configuration information.

Example Embodiment 6

Figure 8:
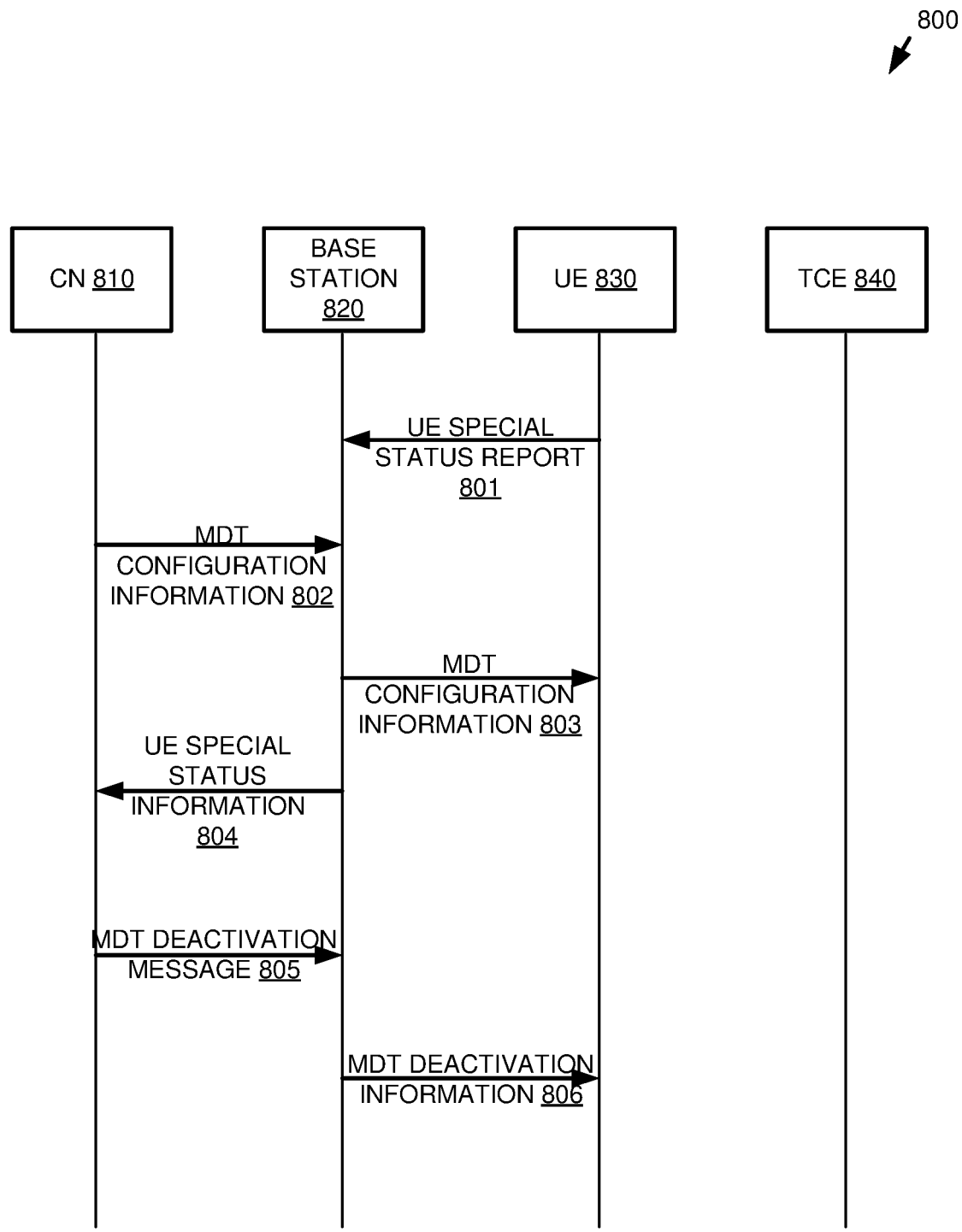
FIG. 8 illustrates a diagram of a signaling process for reporting MDT measurements, according to a sixth example embodiment.

FIG. 8 illustrates a diagram of a signaling process 800 for reporting MDT measurements, according to a sixth example embodiment. In step 801, the UE 830 may report to the base station 820 that the UE is currently in a special state such as overheating, energy saving, etc. The UE may report to the base station that the UE is currently in a special state by event triggering or periodic reporting. When reporting to the base station by the event triggering report mode, the UE may report to the base station that the UE currently enters and exits the special state when entering and exiting the special state.

In step 802, the CN 810 may send immediate MDT configuration information to the base station 820 and the designated UE for MDT measurement.

In step 803, the base station 820 may send related MDT configuration information to the designated UE 830 according to the MDT configuration information received from the CN.

In step 804, the base station 820 may determine that the designated UE is currently in a special state. The base station may send the UE special status information to the CN and notify the CN that the current UE is in a special state, such as overheating, energy saving, etc.

In step 805, the CN 810 may send a MDT deactivation message for the designated UE in a special state to the base station.

In step 806, the base station 820 based on the MDT deactivation message for the designated UE transmits MDT deactivation information to the designated UE, so that the specified UE stops MDT measurement.

Example Embodiment 7

Figure 9:
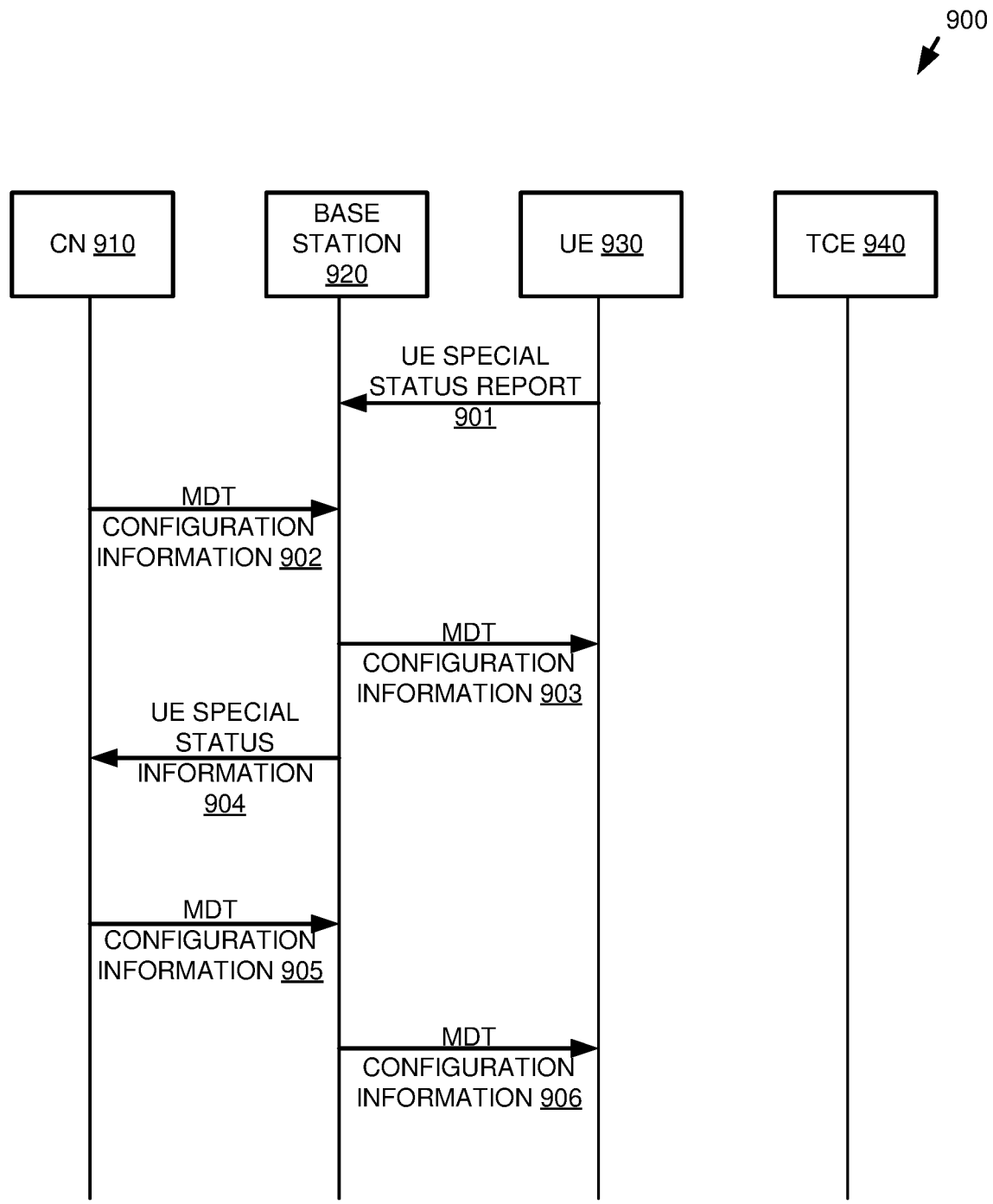
FIG. 9 illustrates a diagram of a signaling process for reporting MDT measurements, according to a seventh example embodiment.

FIG. 9 illustrates a diagram of a signaling process 900 for reporting MDT measurements, according to a seventh example embodiment. Steps 901-903 may be similar to steps 801-803 as described with respect to FIG. 8.

In step 904, the base station 920 may determine that the designated UE is currently in a special state. The base station 920 may send the UE special status information to the CN and notify the CN that the current UE is in a special state, such as overheating, energy saving, etc. The UE special status information may also include at least one of the following: severity (e.g., high, medium, low), measurement information that is temporarily unavailable.

In step 905, the CN 910 may determine to deactivate the MDT of the designated UE or delete part of the MDT measurement according to the received UE special status information. If it is decided to delete part of the MDT measurement, the CN 910 may send the MDT configuration information to the base station for the designated UE after deleting part of the MDT measurement.

In step 906, the base station 920 may send related MDT configuration information to the designated UE 930 according to the MDT configuration information received from the CN.

Example Embodiment 8

Figure 10:
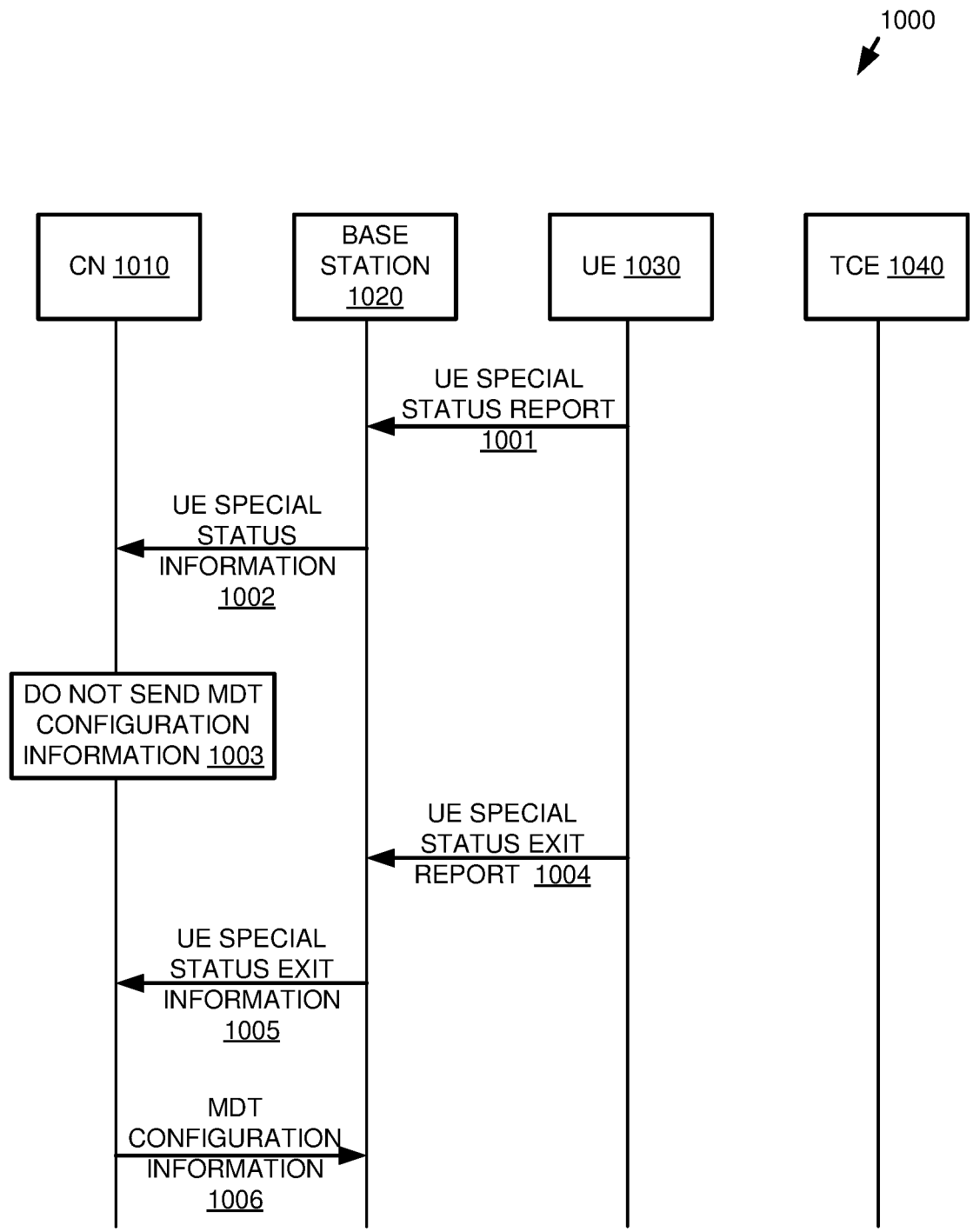
FIG. 10 illustrates a diagram of a signaling process for reporting MDT measurements, according to an eighth example embodiment.

FIG. 10 illustrates a diagram of a signaling process 1000 for reporting MDT measurements, according to an eighth example embodiment. In step 1001, the UE 1030 may report to the base station 1020 that the UE is currently in a special state such as overheating, energy saving, etc. The UE 1030 may report to the base station that the UE is currently in a special state by means of event triggering or periodic reporting. When reporting to the base station by the event triggering report mode, the UE may report to the base station that the UE enters and exits the special state when entering and exiting the special state.

In step 1002, the base station 1020 may send the UE special status information to the CN and notify the CN that the current UE is in a special state, such as overheating, energy saving, etc.

In step 1003, the CN 1010 may intend to select a specified UE for immediate MDT measurement, but the specified UE may currently be in a special state and decide not to transmit for the specified UE the MDT configuration information to the base station.

In step 1004, the UE 1030 may report to the base station 1020 that the UE has exited the special state.

In step 1005, the base station 1020 may send the UE special status exit information to the CN 1010 and notify the CN that the current UE has exited the special state.

In step 1006, the CN 1010 may still intend to select the specified UE 1030 for immediate MDT measurement, according to the specified UE current having exited the special state, and decide to transmit to the base station the MDT configuration information for the specified UE.

Example Embodiment 9

Figure 11:
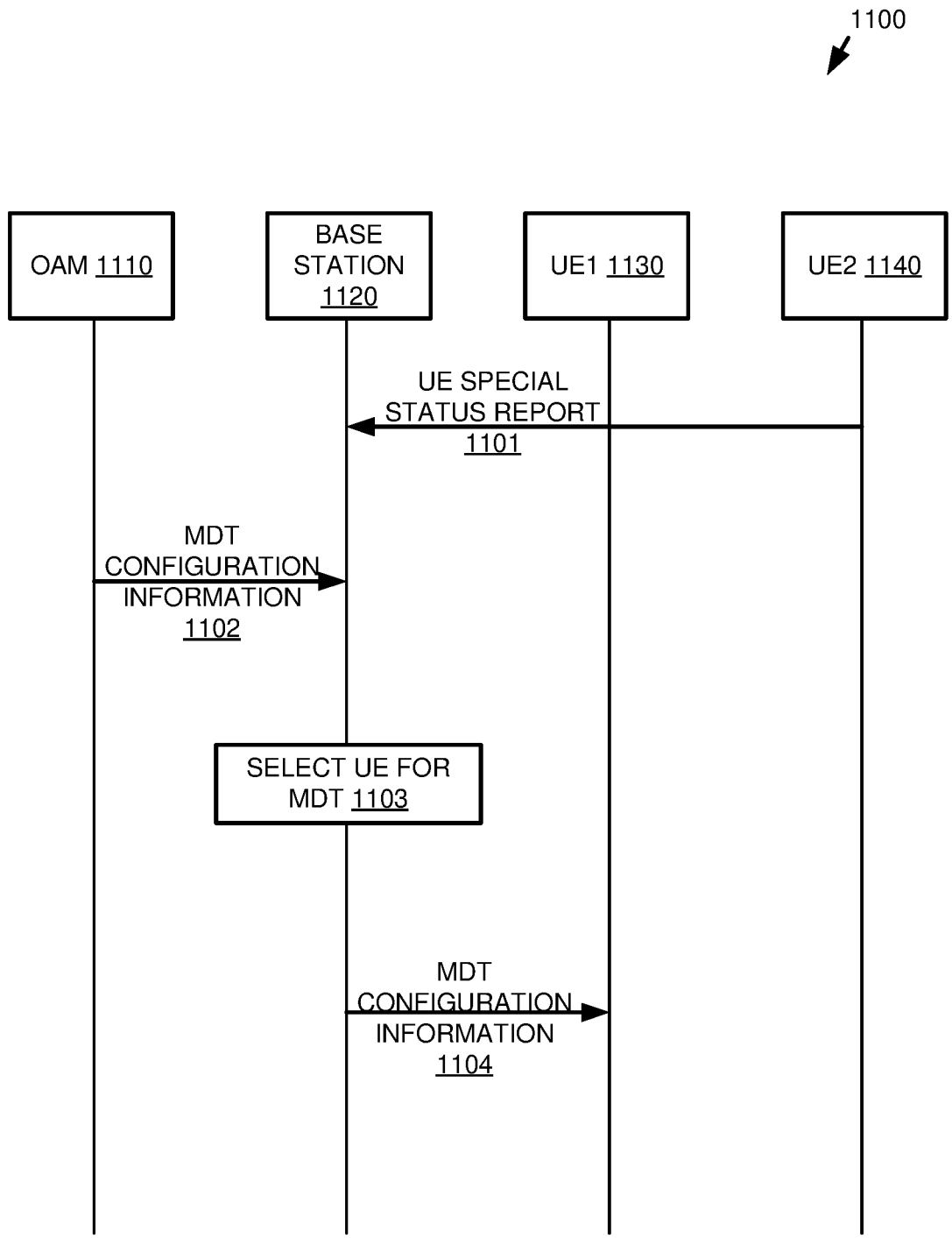
FIG. 11 illustrates a diagram of a signaling process for reporting MDT measurements, according to a ninth example embodiment.

FIG. 11 illustrates a diagram of a signaling process 1100 for reporting MDT measurements, according to a ninth example embodiment. In step 1101, the UE2 1140 may report to the base station 1120 that the UE2 is currently in a special state such as overheating, energy saving, etc. The UE may report to the base station that the UE is currently in a special state by means of event triggering or periodic reporting. When reporting to the base station by the event triggering report mode, the UE may report to the base station that the UE currently enters and exits the special state when entering and exiting the special state.

In step 1102, the OAM 1110 may send the Immediate MDT configuration information to the base station 1020.

In step 1103, the base station 1120 may select the UE to perform MDT according to the MDT configuration information and intends to select UE1 and UE2 to perform MDT measurement, but finds that UE2 is currently in a special state, and therefore UE2 may not be selected.

In step 1104, the base station 1120 may send related MDT configuration information to the UE1 1130.

Example Embodiment 10

Figure 12:
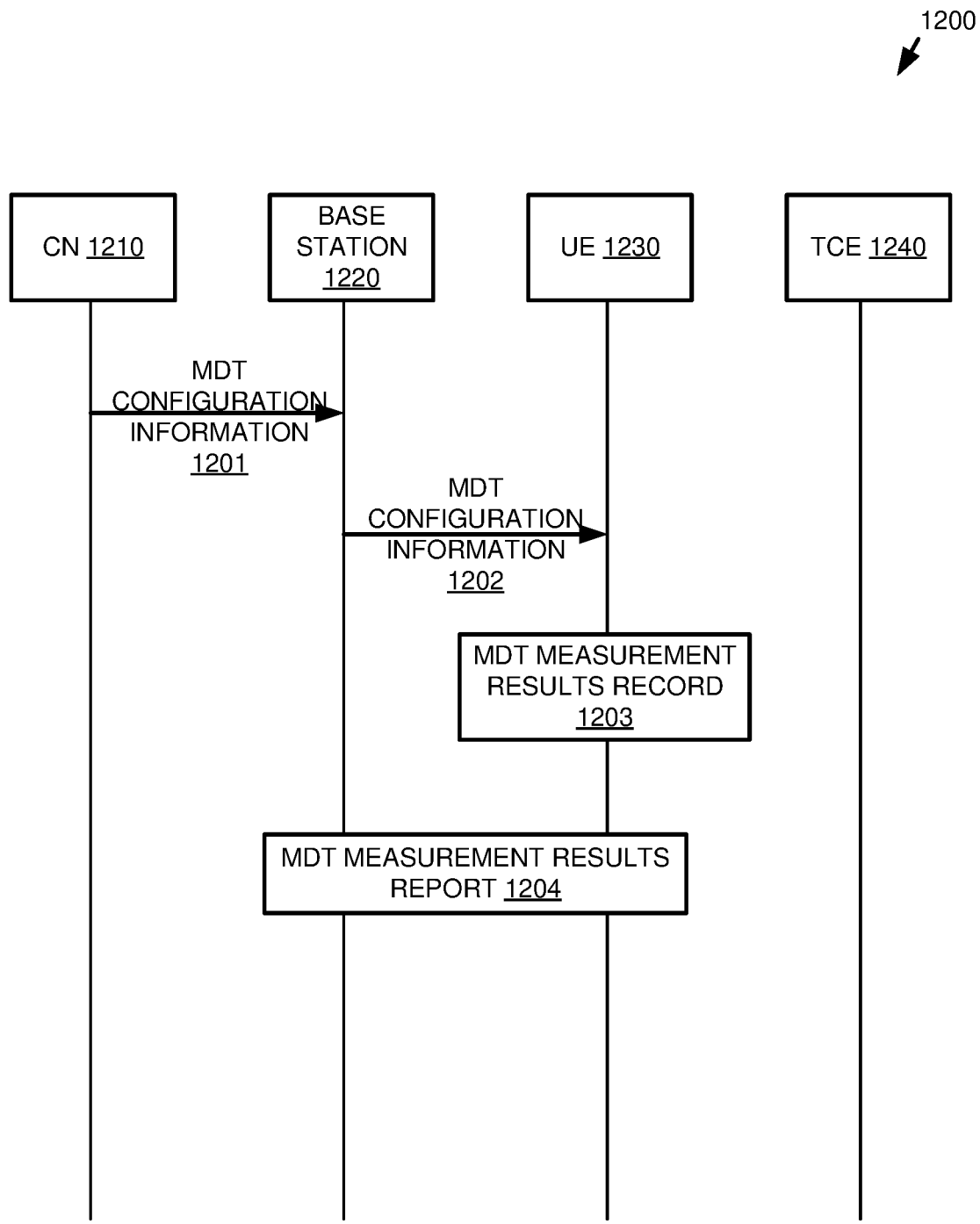
FIG. 12 illustrates a diagram of a signaling process for reporting MDT measurements, according to a tenth example embodiment.

FIG. 12 illustrates a diagram of a signaling process 1200 for reporting MDT measurements, according to a tenth example embodiment. In step 1201, the CN 1210 may send the Logged MDT configuration information to the base station 1220 and specifies the UE that performs the MDT measurement.

In step 1202, the base station 1220 may send related MDT configuration information to the designated UE 1230 according to the MDT configuration information received from the CN.

In step 1203, the UE may enter an RRC_IDLE or RRC_INACTIVE state, and the UE may perform a related MDT measurement, and records the measurement result. For each MDT measurement record, if the relevant MDT measurement is performed by the UE in a special state, the MDT measurement record may include the UE special status indication, or the UE does not save the MDT measurement record. The UE special status indication may be used to indicate that the UE is in a special state such as overheating, power saving, and the like.

In step 1204, the UE may report the related Logged MDT measurement result to the base station.

Example Embodiment 11

Figure 13:
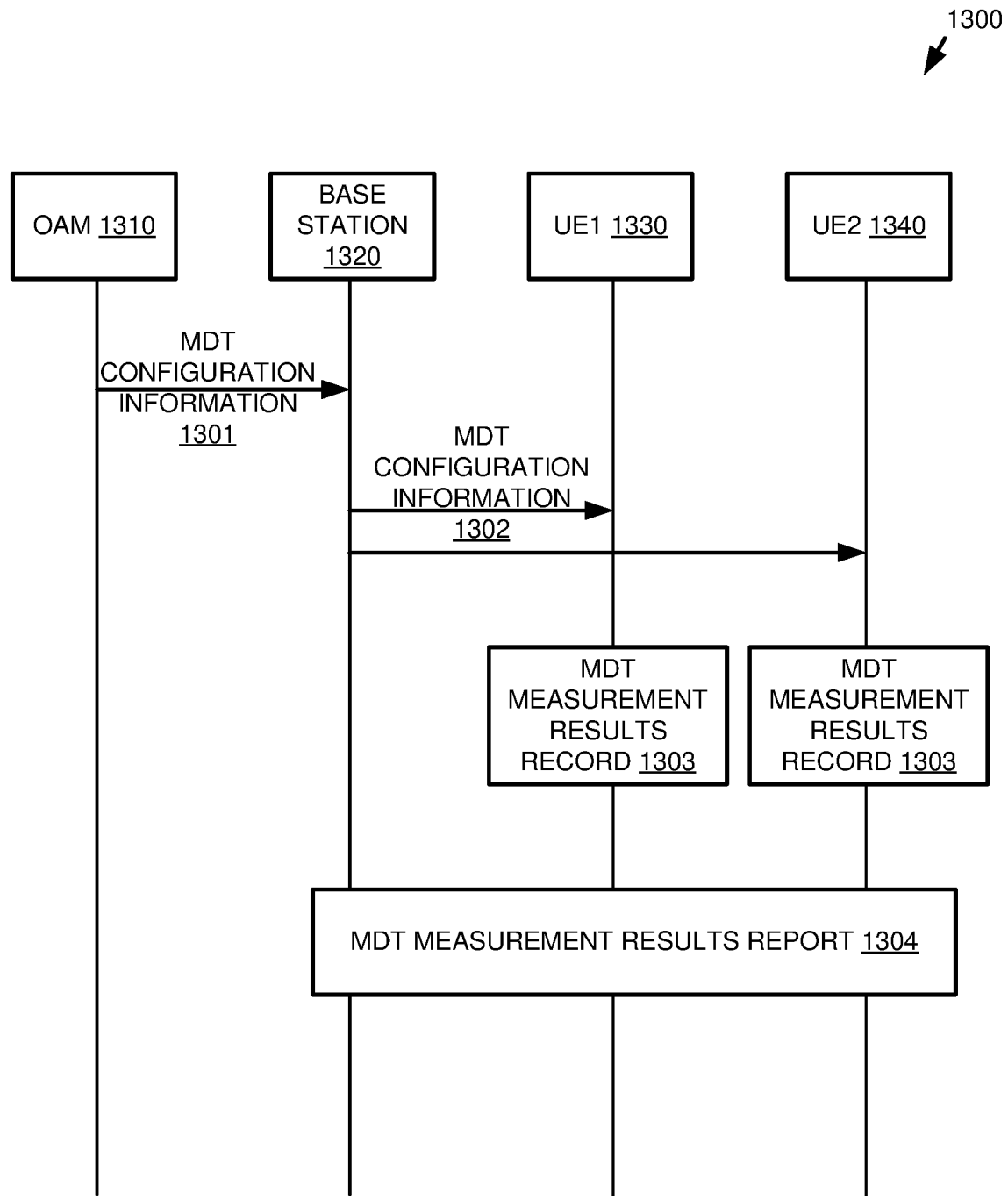
FIG. 13 illustrates a diagram of a signaling process for reporting MDT measurements, according to an eleventh example embodiment.

FIG. 13 illustrates a diagram of a signaling process 1300 for reporting MDT measurements, according to an eleventh example embodiment. In step 1301, the OAM 1310 may send the Logged MDT configuration information to the base station 1320.

In step 1302, the base station 1320 selects UE1 and UE2 to perform MDT measurement according to the MDT configuration information received from the OAM 1310, and may send related MDT configuration information to UE1 and UE2.

In step 1303, UE1 1330 and UE2 1340 may enter an RRC_IDLE or RRC_INACTIVE state, and UE1 and UE2 respectively may perform related MDT measurement, and may record the measurement result. For each MDT measurement record, if the relevant MDT measurement is performed by the UE in a special state, the MDT measurement record may include the UE special status indication, or the UE does not save the MDT measurement record. The UE special status indication may be used to indicate that the UE is in a special state such as overheating, power saving, etc.

In step 1304, the UE1 1330 and the UE2 1340 may report the related Logged MDT measurement results to the base station 1320.

Example Embodiment 12

Figure 14:
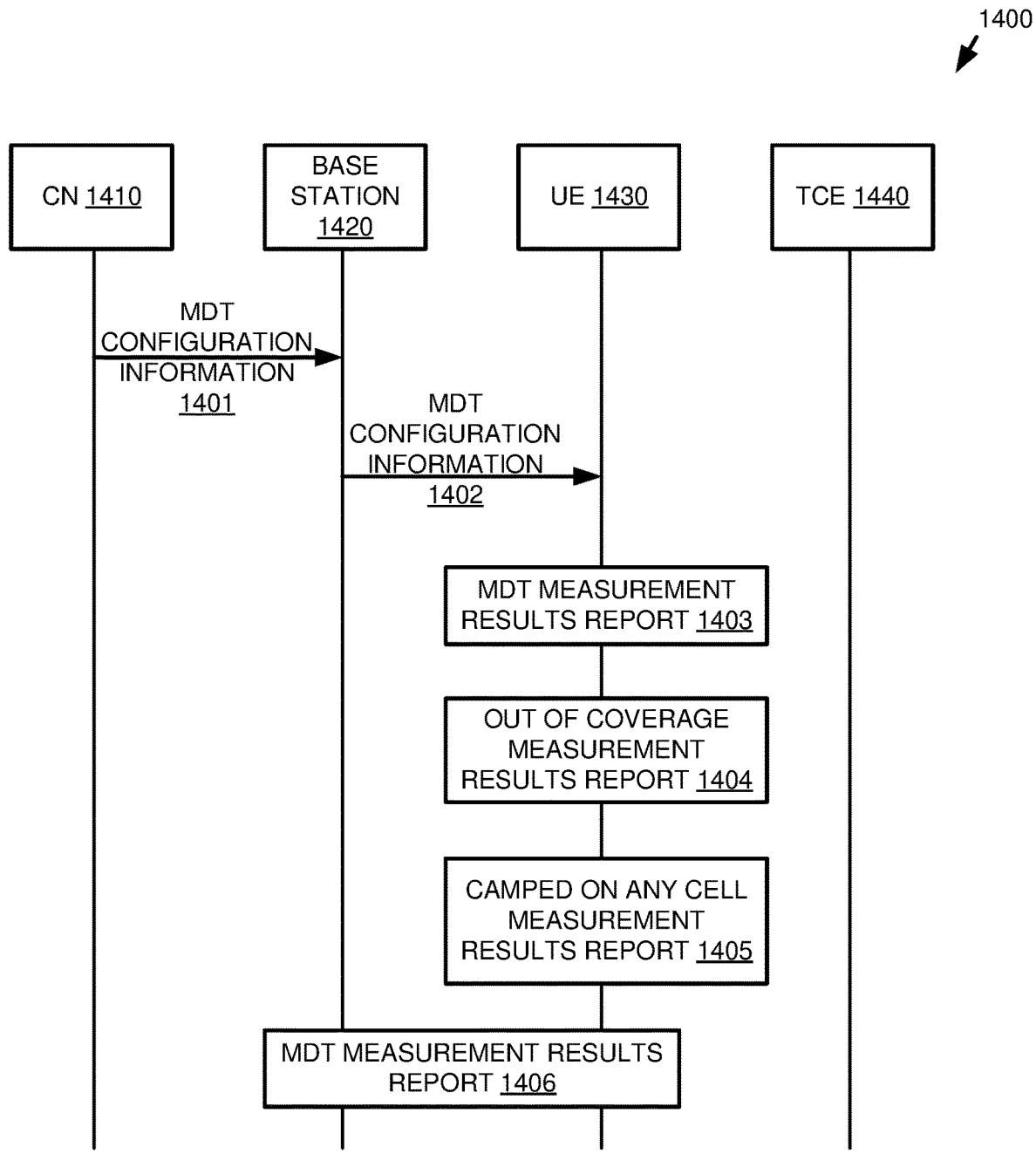
FIG. 14 illustrates a diagram of a signaling process for reporting MDT measurements, according to a twelfth example embodiment.

FIG. 14 illustrates a diagram of a signaling process 1400 for reporting MDT measurements, according to a twelfth example embodiment. In step 1401, the CN 1410 may send the Logged MDT configuration information to the base station 1420 and specifies the UE that performs the MDT measurement. Logged MDT configuration information may include two recording intervals (or Logging intervals), one interval for Logged MDT measurement, another for the out of coverage measurement.

In step 1402, the base station 1420 may send related MDT configuration information to the designated UE according to the MDT configuration information received from the CN.

In step 1403, the UE 1430 may enter the RRC_IDLE or RRC_INACTIVE state and stays normally (Camped Normally), and the UE may perform measurement at this time according to the interval configured for Logged MDT measurement recording and records the measurement result.

In step 1404, the UE 1430 may enter the Camped on Any Cell Selection state (i.e., Out Of Coverage status), the UE according to the interval configured for Out Of coverage measurement recording, perform the measurement at every time spanning the interval and the measurement results are recorded. Every piece of the Out Of coverage measurement records may include at least one of: UE currently in Out Of coverage status, UE location information, moving direction information of the UE, the UE moving speed information, and current time information.

In step 1405, the UE 1430 may enter a Camped on Any Cell state, and the UE may record the state. The Camped on Any Cell status record may include at least one of the following: an indication of the status of Camping on Any Cell at the UE, the location information of entering the Camped on Any Cell state, the moving direction information of entering the Camped on Any Cell state, the moving speed information of entering the Camped on Any Cell state, the position information of exiting the Camping on Any Cell state, the moving direction information of exiting the Camping on Any Cell state, the moving speed information of exiting the Camping on Any Cell state, the time information of entering the Camping on Any Cell state, the time information of exiting the Camping on Any Cell state, the duration information in the Camped on Any Cell state. The position information of exiting the Camped on Any Cell state, the moving direction information of exiting the Camped on Any Cell state, the moving speed information of exiting the Camped on Any Cell state, the time information of exiting the Camped on Any Cell state, and the duration information in the Camped on Any Cell state, can be filled in when the UE exits the Camping on Any Cell state.

In step 1406, the UE 1430 may report the related Logged MDT measurement result to the base station, which may include any of the following:

(1) The UE may transmit to the base station the indication of having the out of coverage measurement record, the base station sends a UE INFORMATION REQUEST message to the UE, including the indication of requesting to acquire the Out Of coverage measurement record, the UE will through the UE INFORMATION RESPONSE message send the Out Of coverage measurement record to the base station.

(2) The UE may send an indication to the base station indicating that there is a Camped on Any Cell status record, and the base station may send a UE INFORMATION REQUEST message to the UE, including an indication that requesting to acquire a Camped on Any Cell status record, and the UE may use the UE INFORMATION RESPONSE message to send the Camped on Any Cell status record to the base station.

(3) The UE may transmit to the base station indicating of having Logged MDT measurement record, the base station transmits to the UE a UE INFORMATION REQUEST message that may comprise an indication representing a request acquisition of Logged MDT measurement record, the Logged MDT measurement record are sent to the base station by UE INFORMATION RESPONSE message. The Logged MDT measurement record may only include the measurement record of the UE when it is in the normal state (Camped Normally), that is, it may not include the measurement record of the UE in the Any Cell Selection state and the Camped on Any Cell state.

(4) The UE may transmit to the base station indicating of having Logged MDT measurement record, the base station may transmit to the UE a UE INFORMATION REQUEST message may include an indication representing a request acquisition of Logged MDT measurement record, the Logged MDT measurement record are sent to the base station by UE INFORMATION RESPONSE message. The Logged MDT measurement records may include all the measurement records recorded when UE residing normally (Camped Normally), in Any Cell Selection state, in camped on Any Cell state.

Example Embodiment 13

Figure 15:
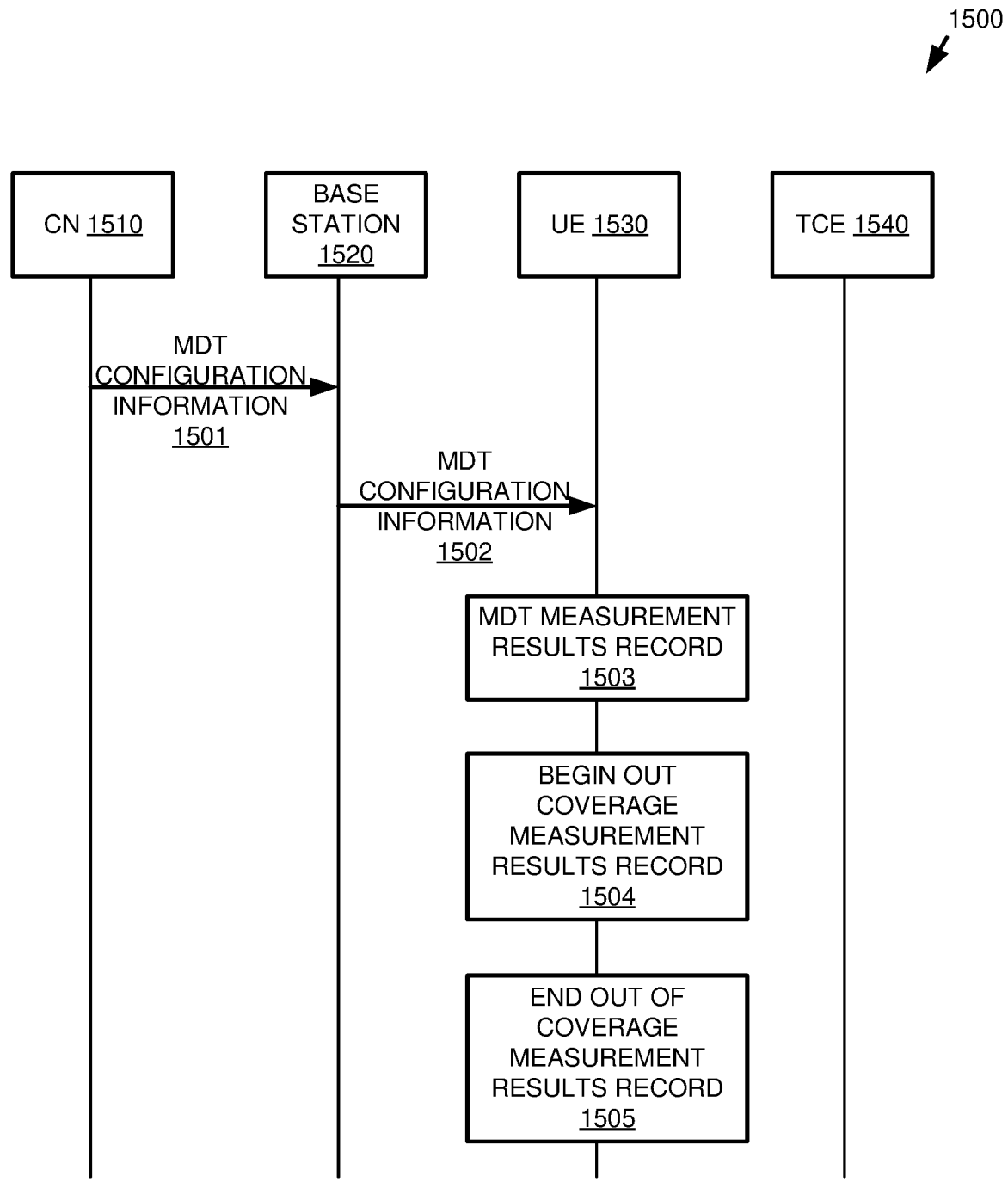
FIG. 15 illustrates a diagram of a signaling process for reporting MDT measurements, according to a thirteenth example embodiment or a fourteenth example embodiment.

FIG. 15 illustrates a diagram of a signaling process 1500 for reporting MDT measurements, according to a thirteenth example embodiment or a fourteenth example embodiment. In step 1501, the CN 1510 may send the Logged MDT configuration information to the base station 1520 and specify the UE that performs the MDT measurement. Logged MDT configuration information may include an indication used to configure the trigger event (event triggered) for Out Of coverage measurement.

In step 1502, the base station 1520 may send related MDT configuration information to the designated UE 1530 according to the MDT configuration information received from the CN.

In step 1503, the UE may enter the RRC_IDLE or RRC_INACTIVE state and stays normally (Camped Normally), and the UE performs measurement every time according to the configured Logged MDT measurement recording interval and records the measurement result.

In step 1504, the UE 1530 may enter the Any Cell Selection state (i.e., Out Of Coverage state), UE triggers the Out Of coverage measurement according to the configured trigger event that may indicate that one measurement is taken and the measurement result is recorded. The Out Of coverage measurement record may include at least one of the following: The indication of UE entering Out Of coverage status, Location information of entering Out Of coverage status, The movement direction information of entering Out Of coverage state, The movement speed information of entering Out Of coverage state, Time information when entering Out Of coverage status.

In step 1505, the UE may exit the Any Cell Selection state, and the UE triggers the Out Of coverage measurement according to the configured event. The Out Of coverage measurement may indicate that one measurement is taken, and the measurement result is recorded. The Out Of coverage measurement record may include at least one of the following: The indication of UE exiting Out Of coverage status, Location information of exiting Out Of coverage status, Information about the movement direction of exiting Out Of coverage state, Mobile speed information of exiting Out Of coverage status, Time information when exiting Out Of coverage status. This Out Of coverage measurement record and the Out Of coverage measurement record in step 1504 may be recorded as 2 separate records.

Example Embodiment 14

In step 1504, the UE may enter the Any Cell Selection state (i.e., Out Of Coverage state), UE triggers the Out of coverage measurement according to the configured event. The configured event indicates that one measurement is taken and the measurement result is recorded. The Out Of coverage measurement record may include at least one of the following: The indication of UE in Out Of coverage status, Location information of entering Out Of coverage status, The movement direction information of entering Out Of coverage state, The movement speed information of entering Out Of coverage state, Time information when entering Out Of coverage status.

In step 1505, the UE may exit the Any Cell Selection state, and the UE triggers Out of coverage measurement according to the configured event. The configured event may indicate that one measurement is taken, and the measurement result is recorded. The Out Of coverage measurement record may include at least one of the following: Location information of exiting Out Of coverage status, Information about the movement direction of exiting Out Of coverage state, Mobile speed information of exiting Out Of coverage status, Time information when exiting Out Of coverage status, The duration information of the out of coverage status. This Out Of coverage measurement record and the Out Of coverage measurement record in step 1504 may be the same record. When the UE exits the Any Cell Selection state, the related measurement information may be added to the Out Of coverage measurement record recorded in step 1504.

Example Embodiment 15

Figure 16:
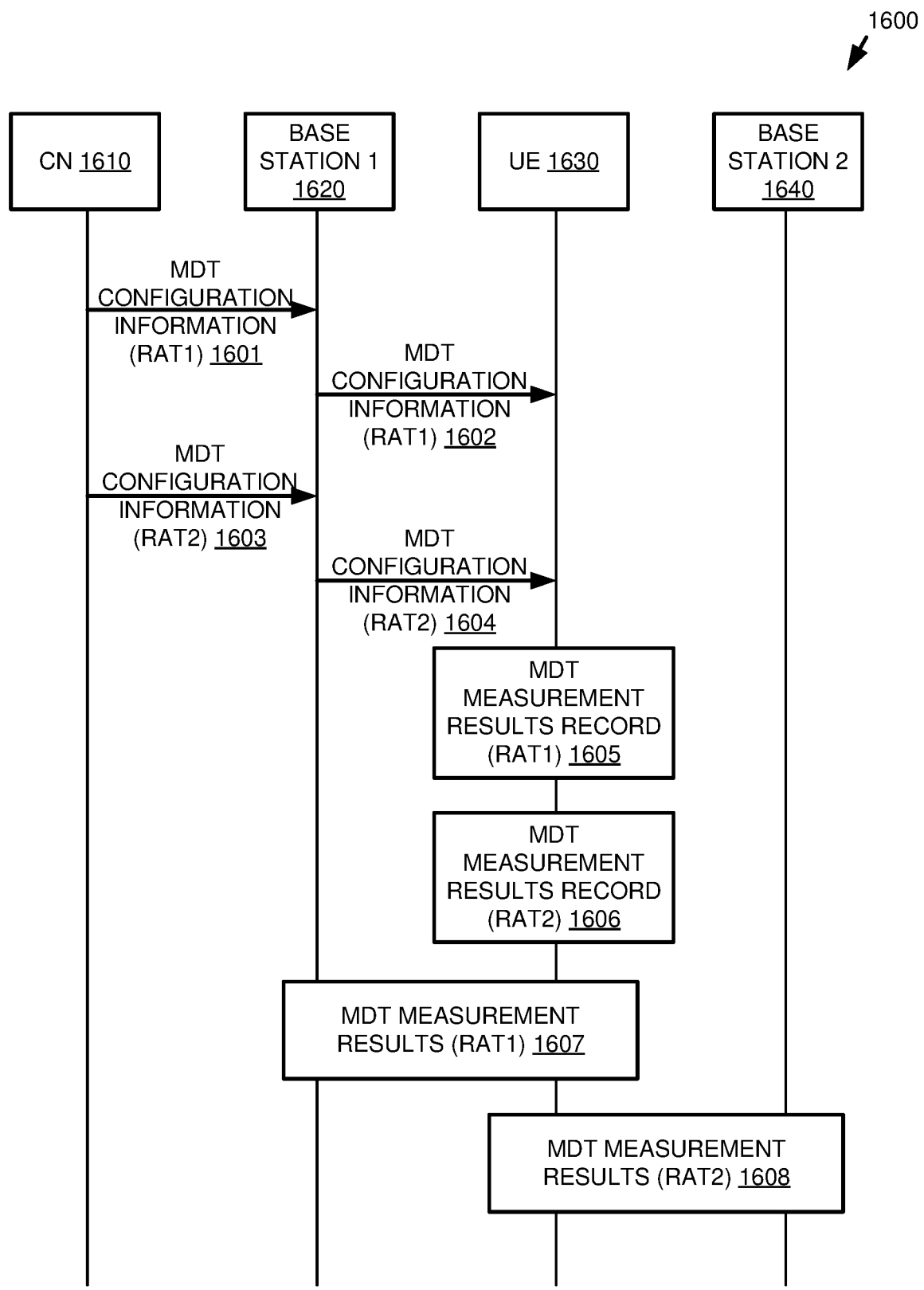
FIG. 16 illustrates a diagram of a signaling process for reporting MDT measurements, according to a fifteenth example embodiment.

FIG. 16 illustrates a diagram of a signaling process 1600 for reporting MDT measurements, according to a fifteenth example embodiment. In step 1601, the CN 1610 may send the Logged MDT configuration information to the base station 1 1620 and specifies the UE that performs the MDT measurement. The Logged MDT configuration information may include RAT information (such as RAT1) for performing MDT measurement.

In step 1602, the base station 1620 may send related MDT configuration information to the designated UE 1630 according to the MDT configuration information received from the CN.

In step 1603, the CN 1610 may send the Logged MDT configuration information to the base station 1 1620 and specifies the UE that performs the MDT measurement. The Logged MDT configuration information may include RAT information (such as RAT2) for performing MDT measurement.

In step 1604, the base station 1620 may send related MDT configuration information to the designated UE according to the MDT configuration information received from the CN.

In step 1605, the UE 1630 may enter the RRC_IDLE or RRC_INACTIVE state and camps on the cell of the RAT1, and the UE performs measurement according to the Logged MDT configuration information of the RAT1 and records the measurement result.

In step 1606, the UE may camp on the cell of the RAT2, and the UE may perform measurement according to the Logged MDT configuration information of the RAT2 and records the measurement result.

In step 1607, the UE may enter the RRC_CONNECTED state and accesses the cell of the RAT1 (such as the cell of the base station 1), and the UE may report the MDT measurement result of the RAT1 to the base station 1.

In step 1608, the UE access to RAT2 cell (e.g., the cell of the base station 2), or, UE access to RAT1 cell (e.g., the cell of the base station 1) and the UE may enter a DC operation, a RAT2 base station (e.g., the base station 2) may be used as a secondary node (SN), and the UE may report the MDT measurement result of the RAT2 to the base station 2.

Example Embodiment 16

Figure 17:
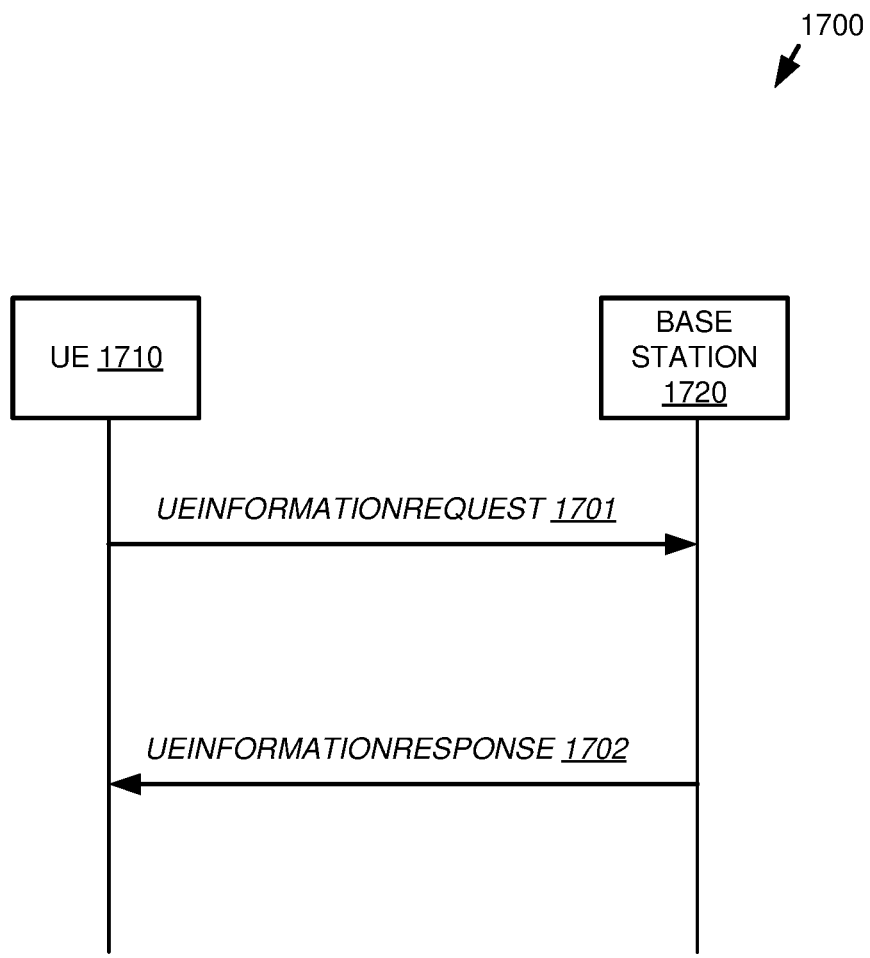
FIG. 17 illustrates a diagram of a signaling process for reporting MDT measurements, according to a sixteenth example embodiment or a seventeenth example embodiment.

FIG. 17 illustrates a diagram of a signaling process 1700 for reporting MDT measurements, according to a sixteenth example embodiment or a seventeenth example embodiment. In step 1701, the base station 1720 may send a UE Information Request message to the UE, where the indication includes requesting to obtain a connection establishment failure report.

In step 1702, the UE 1710 may send to the base station an UE Information Response message. The UE Information Response message may include the connection establishment failure report (Connection Establishment Failure Report). The connection establishment failure report may include one or more connection establishment failure records. When the connection establishment failure report may include only one connection establishment failure record, the record may include at least one of: one or more cell identifier of cell(s) in which connection establishment failure occurs, one or more location information of UE when connection establishment failure occurs, one or more Time information when the connection fails. When the connection establishment failure report includes multiple connection establishment failure records, each record may include at least one of the following: the cell identifier of the cell in which the connection establishment fails, the location information of the UE when the failure occurs, the UE moving direction information when the failure occurs, moving speed information of the UE when the failure occurs, the time information when the failure occurs.

Example Embodiment 17

In step 1701, the base station may send a UE Information Request message to the UE, where the indication may include a request to obtain a mobility history report.

In step 1702, the UE may send to the base station the UE Information Response message including a mobile history report (Mobility History Report). Mobility history report may include one or more records, each record including at least one of the following: identifier of stayed cell, how long having stayed in the cell, the beam identifier of stayed beam, how long having stayed in the beam, identifier of the stayed PSCell, the length of time spent in the PSCell.

Example Embodiment 18

Figure 18:
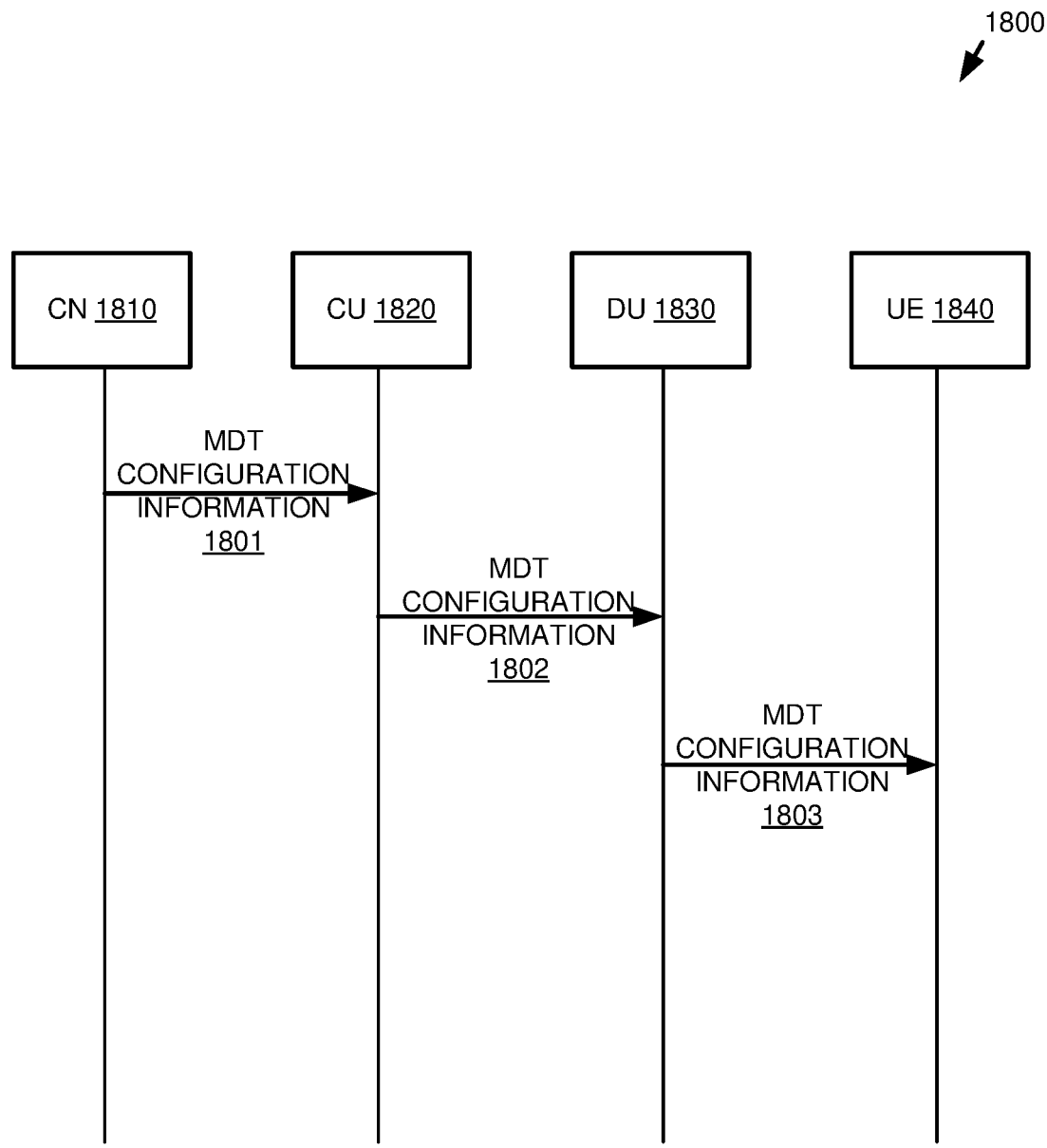
FIG. 18 illustrates a diagram of a signaling process for reporting MDT measurements, according to an eighteenth example embodiment.

FIG. 18 illustrates a diagram of a signaling process for reporting MDT measurements, according to an eighteenth example embodiment. In step 1801, the CN 1810 may send the MDT configuration information to the CU 1820 and specifies the UE that performs the MDT measurement. The MDT configuration information may include at least one of the following: RAT information for performing MDT measurement, the recording interval (Logging interval) specifically for configuring Out Of coverage periodic measurement, indication of event trigger (event triggered) specifically for configuring Out Of coverage measurements.

In step 1802, the CU 1820 may send the related MDT configuration information to the DU 1830 through the F1 interface according to the received MDT configuration information. The related MDT configuration information may include at least one of the following: RAT information for performing MDT measurement, the recording interval (Logging interval) specifically for configuring Out Of coverage periodic measurement, indication of event trigger (event triggered) specifically for configuring Out Of coverage measurements.

In step 1803, the DU 1830 may send the related MDT configuration information to the designated UE 1840 according to the received MDT configuration information. The related MDT configuration information may include at least one of the following: RAT information for performing MDT measurement, the recording interval (Logging interval) specifically for configuring Out Of coverage periodic measurement, indication of event trigger (event triggered) specifically for configuring Out Of coverage measurements.

Figure 19:
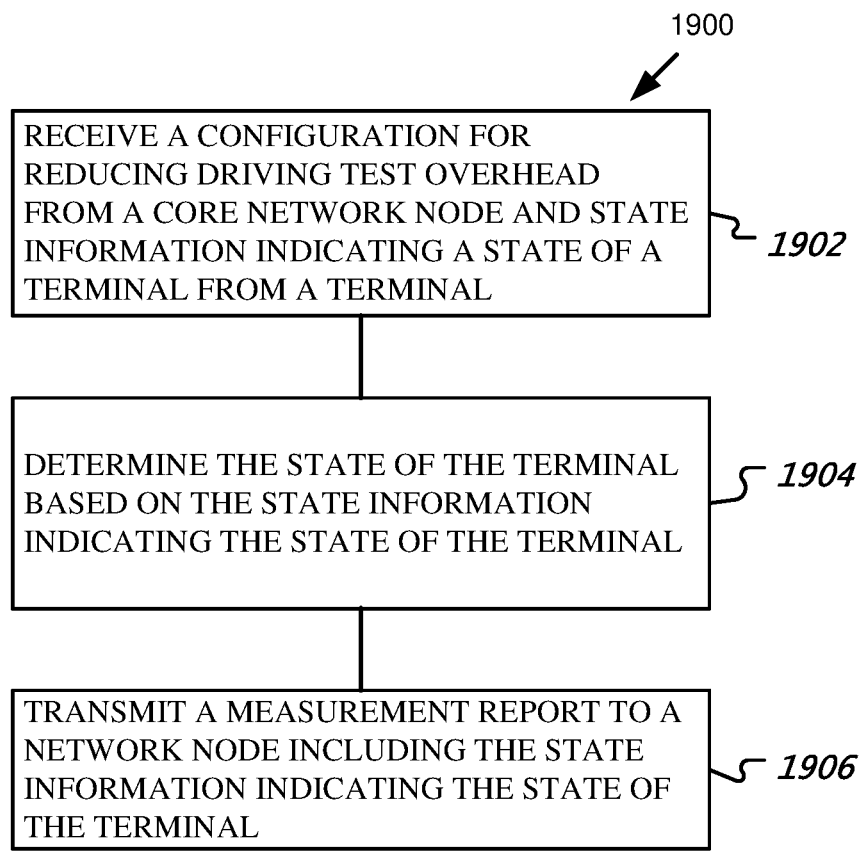
FIG. 19 illustrates a block diagram of an example method for reporting MDT measurements.

FIG. 19 illustrates a flowchart 1900 of a method to reporting MDT measurements. The method 1900 may include receiving a configuration for reducing driving test overhead from a core network node and state information indicating a state of a terminal from a terminal (block 1902). The configuration for reducing driving test overhead may include a minimization of driving test (MDT) configuration as discussed in the present embodiments.

The method may also include determining the state of the terminal based on the state information indicating the state of the terminal (block 1904). The method may also include transmitting a measurement report to a network node including the state information indicating the state of the terminal (block 1906).

In some embodiments, the measurement report includes a measurement performed by any of the terminal or the communication node.

In some embodiments, the configuration for reducing driving test overhead indicates a first set of measurements to be performed by the communication node and/or a second set of measurements to be performed by any of the terminal or the communication node with the terminal, wherein the configuration for reducing driving test overhead includes a minimization of driving test (MDT) configuration.

In some embodiments, a method for wireless communication may include receiving, by a terminal, a configuration for minimization of driving test (MDT) from a communication node. The method may also include determining, by the terminal, that the terminal is in a special state, wherein the terminal is configured to not perform any measurement while in the special state or transmit any measurements recorded by the terminal in the special state with an indicator that the terminal is in the special state to the communication node.

In some embodiments, the method includes receiving, by the communication node, the second set of measurements performed by the terminal and information indicating an updated state of the terminal, and forwarding, by the communication node, the second set of measurements and the information indicating the updated state of the terminal to the network node, wherein the network node is configured to perform statistical processing of the second set of measurements based on identifying that the information indicating the updated state of the terminal indicates that the terminal is in the special state.

In some embodiments, the method includes forwarding, by the communication node, the received configuration to the terminal, wherein the terminal is configured to perform the second set of measurements based on the configuration.

In some embodiments, the method includes receiving, by the communication node, a terminal status report from the terminal indicating that the terminal is in the special state, wherein the terminal status report is transmitted based on a triggering of a status change of the terminal or an occurrence of a period reporting time instance.

In some embodiments, the method includes transmitting, by the communication node, a configuration partial success message to the core network node, the configuration part success message indicating that the first set of measurements are capable of being performed by the communication node and the second set of measurements are not capable of being performed by the terminal.

In some embodiments, the method includes sending, by the communication node, a configuration failure message to the core network node based on determining that the terminal is in the special state, the configuration failure message indicating that the terminal is not capable of performing any measurements.

In some embodiments, the method includes receiving, by the communication node, an additional configuration that includes a first set of measurements for the terminal; and performing, by the communication node, the first set of measurements according to the additional configuration.

In some embodiments, the method includes transmitting, by the communication node, a special status message to the core network node indicating that the terminal is in the special state; receiving, by the communication node, a deactivation message from the core network node including information for deactivating measurements by the terminal; and forwarding, by the communication node, the deactivation message to the terminal, wherein the terminal is configured to deactivate measurements based on receiving the deactivation message.

In some embodiments, the method includes transmitting, by the communication node, a special status message to the core network node indicating that the terminal is in the special state; receiving, by the communication node, a configuration that does not include measurements that are not capable of being performed by the terminal based on the core network node determining that the terminal is in the special state; and forwarding, by the communication node, the configuration to the terminal.

In some embodiments, the method includes transmitting, by the communication node, a special status message to the core network node indicating that the terminal is in the special state; receiving, by the communication node, a status exit report from the terminal indicating that the terminal has exited the special state and has entered into a normal state; forwarding, by the communication node, the status exit report to the core network node; and receiving, by the communication node, a second configuration from the core network node based on the core network node receiving the status exit report.

In some embodiments, the method includes receiving, by the communication node, a special status report from a second terminal indicating whether the second terminal is in the special status; receiving, by the communication node, the configuration from an operation administration and maintenance (OAM) node; selecting, by the communication node, a selected terminal based on receiving the special status report from the second terminal indicating that the second terminal is not in the special status; and forwarding, by the communication node, the configuration to the selected terminal.

In some embodiments, the measurement includes an immediate MDT measurement corresponding to a radio resource control connected state.

In some embodiments, the state information indicates at least one of the following: the terminal is in an overheating state, the terminal is in a power saving state, the terminal is in a special or normal state, the terminal has entered or exited the overheating state, the terminal has entered or exited the power saving state, the terminal has entered or exited the special state, an indication of a severity level, and a measurement list including measurements that are not capable of being performed.

In another embodiment, a method for wireless communication includes receiving, by a terminal, a logged configuration for reducing driving test overhead from a communication node. The method may also include performing, by the terminal, measurement while in an idle or inactive state based on the configuration for reducing driving test overhead. The method may also include recording, by the terminal, all measurement records performed by the terminal in a normal state. The method may also include transmitting, by the terminal, the measurement records to the base station.

In some embodiments, the method includes determining, by the terminal, that the terminal is in a special state; and discarding, by the terminal, any measurement records recorded by the terminal in the special state or transmitting any measurement records recorded by the terminal in the special state with an indication of being in the special state or the terminal does not perform any measurement while in the special state.

In another embodiment, a method for wireless communication includes receiving, by a communication node, a logged configuration for reducing driving test overhead from a network node. The method also includes transmitting, by the communication node, the logged configuration for reducing driving test overhead to a first terminal and a second terminal, wherein the first terminal and second terminal are configured to perform measurement in an idle or inactive state and record any measurement records when each of the first terminal and the second terminal are in a normal state. The method also includes receiving, by the communication node, the measurement records recorded by the first terminal and the second terminal.

In some embodiments, each of the first terminal and the second terminal are configured to: determine that the first terminal or second terminal is in a special state; and discard, by the first terminal or second terminal, any measurement records recorded by the terminal in the special state, or transmitting, by the first terminal or second terminal, each of the measurement records recorded by the first terminal or second terminal in the special state with an indication of being in the special state, or the first terminal or second terminal does not perform any measurement while in the special state.

In another embodiment, a method for wireless communication includes receiving, by a terminal, a logged configuration for reducing driving test overhead from a base station, the logged configuration including an interval configured for an out of coverage periodic measurement, where the interval configured for the out of coverage periodic measurement is different than the interval configured for the logged configuration. The method also includes performing, by the terminal, an out of coverage periodic measurement and recording the out of coverage periodic measurement at each time instance identified by the interval configured for the out of coverage periodic measurement when the terminal enters a camped on any cell selection state. The method also includes sending, by the terminal, the out of coverage periodic measurement records recorded by the terminal to the base station.

In some embodiments, the out of coverage periodic measurement record includes any of: a terminal in out of coverage status, terminal location information, a moving direction of the terminal, a terminal moving speed information, and current time information.

Figure 20:
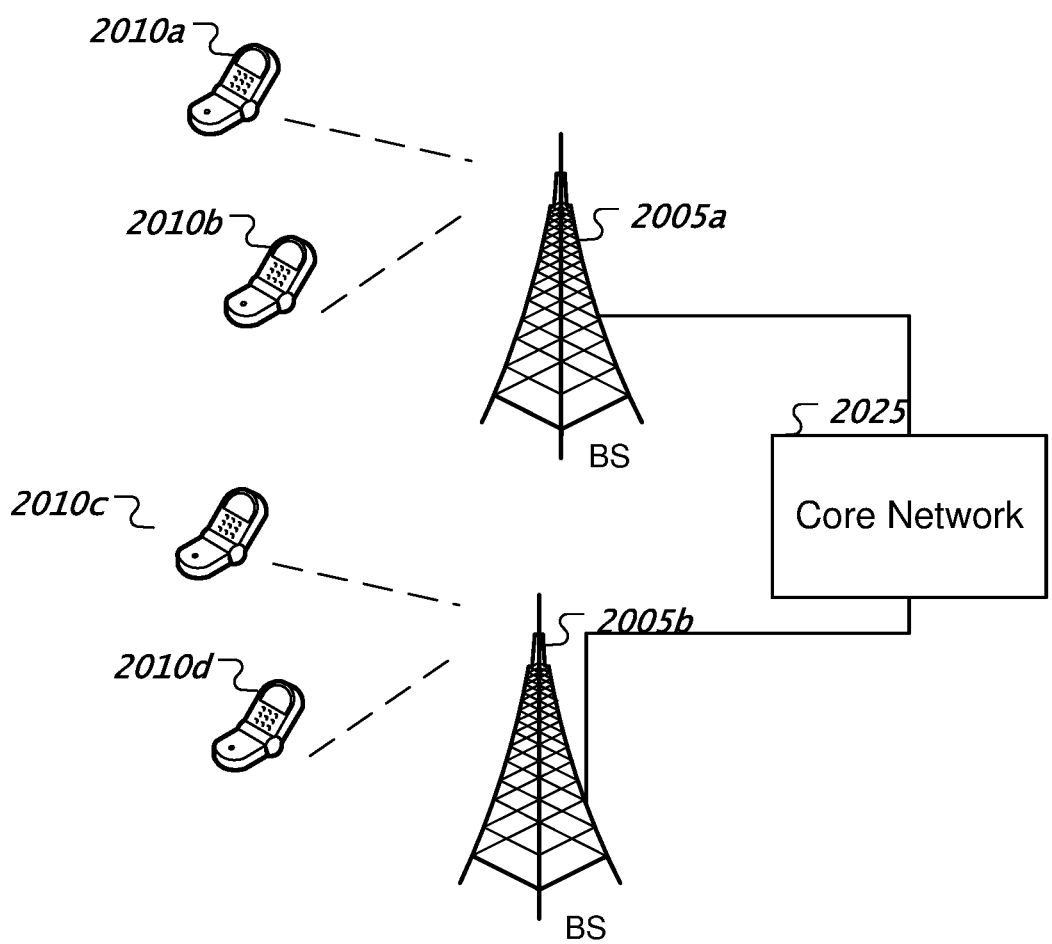
FIG. 20 shows an example of a wireless communication system where techniques in accordance with one or more embodiments of the present technology can be applied.

FIG. 20 shows an example of a wireless communication system where techniques in accordance with one or more embodiments of the present technology can be applied. A wireless communication system 2000 can include one or more base stations (BSs) 2005a, 2005b, one or more wireless devices 2010a, 2010b, 2010c, 2010d, and a core network 2025. A base station 2005a, 2005b can provide wireless service to wireless devices 2010a, 2010b, 2010c and 2010d in one or more wireless sectors. In some implementations, a base station 2005a, 2005b includes directional antennas to produce two or more directional beams to provide wireless coverage in different sectors.

In the above-described methods, the terminal may be, for example, a UE or a wireless device as described herein. In the above-described methods, the communication node may be, for example, a base station. In the above-described methods, the network node may be a TCE, a base station, or a nodeB. A core network node, for example, may be a CN node or a server located in the core network of a wireless system The core network 2025 can communicate with one or more base stations 2005a, 2005b. The core network 2025 provides connectivity with other wireless communication systems and wired communication systems. The core network may include one or more service subscription databases to store information related to the subscribed wireless devices 2010a, 2010b, 2010c, and 2010d. A first base station 2005a can provide wireless service based on a first radio access technology, whereas a second base station 2005b can provide wireless service based on a second radio access technology. The base stations 2005a and 2005b may be co-located or may be separately installed in the field according to the deployment scenario. The wireless devices 2010a, 2010b, 2010c, and 2010d can support multiple different radio access technologies. In some embodiments, the base stations 2005a, 2005b may be configured to implement some techniques described in the present document. The wireless devices 2010a to 2010d may be configured to implement some techniques described in the present document.

Figure 21:
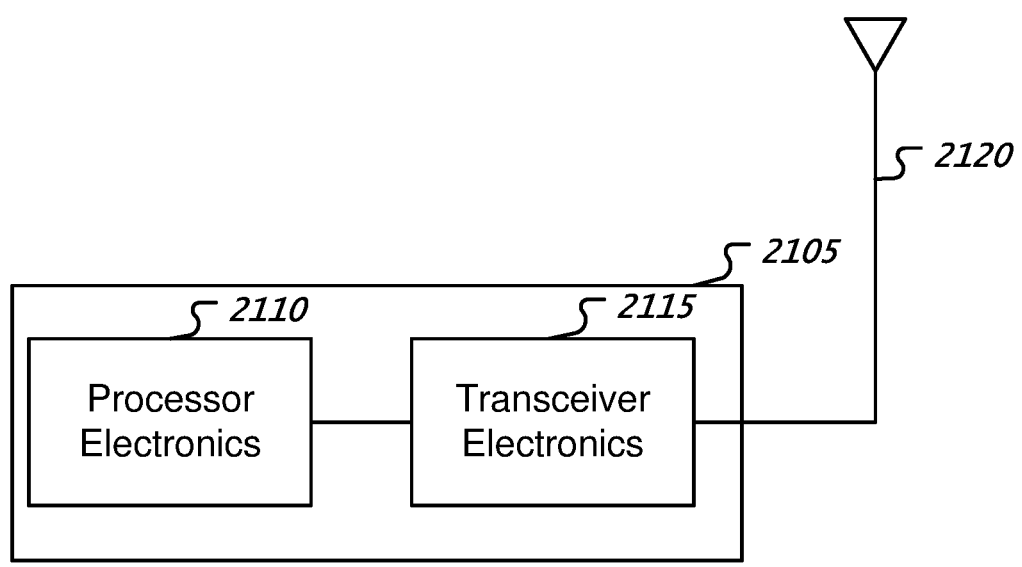
FIG. 21 is a block diagram representation of a portion of a hardware platform.

FIG. 21 is a block diagram representation of a portion of a hardware platform. A hardware platform 2105 such as a network device or a communication node or a base station or a wireless device (or UE) or a terminal can include processor electronics 2110 such as a microprocessor that implements one or more of the techniques presented in this document. The hardware platform 2105 can include transceiver electronics 2115 to send and/or receive wired or wireless signals over one or more communication interfaces such as antenna 2120 or a wireline interface. The hardware platform 2105 can implement other communication interfaces with defined protocols for transmitting and receiving data. The hardware platform 2105 can include one or more memories (not explicitly shown) configured to store information such as data and/or instructions. In some implementations, the processor electronics 2110 can include at least a portion of the transceiver electronics 2115. In some embodiments, at least some of the disclosed techniques, modules or functions and network nodes are implemented using the hardware platform 2105.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a wireless communication device, a logged minimization of drive test (MDT) configuration from a wireless communication node,
      wherein the logged MDT configuration includes one or more of the following:
         an indication of event trigger configured for out of coverage (OOC) measurements, or
         a recording interval for an out of coverage periodic measurement;
   performing the out of coverage measurements by the wireless communication device, wherein the out of coverage measurements performed by the wireless communication device comprises:
      triggering, by the wireless communication device, a first out of coverage measurement according to a configured event when the wireless communication device enters an any cell selection state, and a measurement result is recorded in an out of coverage measurement record;
      performing, by the wireless communication device that has entered in an out of coverage state, an out of coverage periodic measurement according to a configured time interval and recording the out of coverage periodic measurement at each time instance identified by an interval configured for the out of coverage periodic measurement; and
      triggering, by the wireless communication device, a second out of coverage measurement according to the configured event when the wireless communication device exits the any cell selection state, and the measurement result is recorded in the out of coverage measurement record; and
      transmitting, by the wireless communication device, the out of coverage measurement record recorded by the wireless communication device to the wireless communication node.

2. The method of claim 1, wherein the logged MDT configuration received by the wireless communication device from the wireless communication node is from a core network.

3. The method of claim 2, wherein the wireless communication device receives the logged MDT configuration from the core network via the wireless communication node and a second wireless communication node.

4. The method of claim 1, wherein the logged MDT configuration received by the wireless communication device from the wireless communication node is from an operation administration and maintenance (OAM) function.

5. The method of claim 1, wherein the out of coverage measurement record for the wireless communication device that has entered in the out of coverage state includes any one or more of the following:
   an indication to indicate that the wireless communication device in an out of coverage status,
   a location information when entering the out of coverage status, a direction information when entering the out of coverage state, a speed information when entering the out of coverage state, and a time information when entering the out of coverage status.

6. The method of claim 5, wherein the wireless communication device has entered the out of coverage state by entering the any cell selection state.

7. The method of claim 1,
wherein the second out of coverage measurement is recorded in the out of coverage measurement record,
wherein the out of coverage measurement record for the wireless communication device that has exited the out of coverage state includes any one or more of the following:
a location information when exiting an out of coverage status,
information about a movement direction when exiting the out of coverage state,
a speed information when exiting the out of coverage status,
a time information when exiting the out of coverage status, and
a duration information of the out of coverage status.

8. The method of claim 7, wherein the wireless communication device has exited the out of coverage state by exiting an any cell selection state.

9. A wireless communication device for wireless communication comprising a processor that is configured to cause the wireless communication device to carry out a method, comprising:
receive a logged minimization of drive test (MDT) configuration from a wireless communication node,
wherein the logged MDT configuration includes one or more of the following:
an indication of event trigger configured for out of coverage (OOC) measurements, or
a recording interval for an out of coverage periodic measurement;
perform the out of coverage measurements, wherein the out of coverage measurements performed by the processor configured to:
trigger a first out of coverage measurement according to a configured event when the wireless communication device enters an any cell selection state, and a measurement result is recorded in an out of coverage measurement record;
perform, by the wireless communication device that has entered in an out of coverage state, an out of coverage periodic measurement according to a configured time interval and recording the out of coverage periodic measurement at each time instance identified by an interval configured for the out of coverage periodic measurement; and
trigger a second out of coverage measurement according to the configured event when the wireless communication device exits the any cell selection state, and the measurement result is recorded in the out of coverage measurement record; and
transmit the out of coverage measurement record recorded by the wireless communication device to the wireless communication node.

10. The wireless communication device of claim 9, wherein the logged MDT configuration received by the wireless communication device from the wireless communication node is from a core network.

11. The wireless communication device of claim 10, wherein the wireless communication device receives the logged MDT configuration from the core network via the wireless communication node and a second wireless communication node.

12. The wireless communication device of claim 9, wherein the logged MDT configuration received by the wireless communication device from the wireless communication node is from an operation administration and maintenance (OAM) function.

13. The wireless communication device of claim 9, wherein the out of coverage measurement record for the wireless communication device that has entered in the out of coverage state includes any one or more of the following:
an indication to indicate that the wireless communication device in an out of coverage status,
a location information when entering the out of coverage status,
a direction information when entering the out of coverage state,
a speed information when entering the out of coverage state, and
a time information when entering the out of coverage status.

14. The wireless communication device of claim 13, wherein the wireless communication device has entered the out of coverage state by entering the any cell selection state.

15. A non-transitory computer readable medium having code stored thereon, the code when executed by a processor, causing the processor to implement a method, comprising:
receiving, by a wireless communication device, a logged minimization of drive test (MDT) configuration from a wireless communication node,
wherein the logged MDT configuration includes one or more of the following:
an indication of event trigger configured for out of coverage (OOC) measurements, or
a recording interval for an out of coverage periodic measurement;
performing the out of coverage measurements by the wireless communication device, wherein the out of coverage measurements performed by the wireless communication device comprises:
triggering, by the wireless communication device, a first out of coverage measurement according to a configured event when the wireless communication device enters an any cell selection state, and a measurement result is recorded in an out of coverage measurement record;
performing, by the wireless communication device that has entered in an out of coverage state, an out of coverage periodic measurement according to a configured time interval and recording the out of coverage periodic measurement at each time instance identified by an interval configured for the out of coverage periodic measurement; and
triggering, by the wireless communication device, a second out of coverage measurement according to the configured event when the wireless communication device exits the any cell selection state, and the measurement result is recorded in the out of coverage measurement record; and
transmitting, by the wireless communication device, the out of coverage measurement record recorded by the wireless communication device to the wireless communication node.

16. The non-transitory computer readable medium of claim 15, wherein the logged MDT configuration received by the wireless communication device from the wireless communication node is from a core network.

17. The non-transitory computer readable medium of claim 16, wherein the wireless communication device receives the logged MDT configuration from the core network via the wireless communication node and a second wireless communication node.

18. The non-transitory computer readable medium of claim 15, wherein the logged MDT configuration received by the wireless communication device from the wireless communication node is from an operation administration and maintenance (OAM) function.

19. The non-transitory computer readable medium of claim 15, wherein the out of coverage measurement record for the wireless communication device that has entered in the out of coverage state includes any one or more of the following:
- an indication to indicate that the wireless communication device in an out of coverage status,
- a location information when entering the out of coverage status,
- a direction information when entering the out of coverage state,
- a speed information when entering the out of coverage state, and
- a time information when entering the out of coverage status.

20. The non-transitory computer readable medium of claim 19, wherein the wireless communication device has entered the out of coverage state by entering the any cell selection state.

* * * * *